United States Patent
Ikoshi et al.

(10) Patent No.: US 11,952,502 B2
(45) Date of Patent: Apr. 9, 2024

(54) TEXTILE PRINTING INK SET AND TEXTILE PRINTING METHOD

(71) Applicant: FUJIFILM CORPORATION, Tokyo (JP)

(72) Inventors: Masao Ikoshi, Kanagawa (JP); Ryoichi Nakano, Kanagawa (JP); Shota Suzuki, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 198 days.

(21) Appl. No.: 17/673,733

(22) Filed: Feb. 16, 2022

(65) Prior Publication Data
US 2022/0169881 A1 Jun. 2, 2022

Related U.S. Application Data

(63) Continuation of application No. PCT/JP2020/036091, filed on Sep. 24, 2020.

(30) Foreign Application Priority Data

Sep. 30, 2019 (JP) ................................. 2019-180586

(51) Int. Cl.
*C09D 11/40* (2014.01)
*B41J 3/407* (2006.01)
(Continued)

(52) U.S. Cl.
CPC ............. *C09D 11/40* (2013.01); *B41J 3/4078* (2013.01); *B41M 5/0023* (2013.01);
(Continued)

(58) Field of Classification Search
CPC ..... C09D 11/40; C09D 11/033; C09D 11/037; C09D 11/328; C09D 11/54; C09D 11/102;
(Continued)

(56) References Cited

U.S. PATENT DOCUMENTS

2006/0010619 A1 1/2006 Hees et al.
2011/0242154 A1 10/2011 Roberts et al.
(Continued)

FOREIGN PATENT DOCUMENTS

JP S52-059786 A 5/1977
JP 2001-270227 A 10/2001
(Continued)

OTHER PUBLICATIONS

Machine Translation of (WO 2018043414) "Inkjet Textile Printing Method, Method for producing colored fabric, and colored fabric", Mar. 8, 2018, [Abstract, Whole Document] (Year: 2018).*
(Continued)

*Primary Examiner* — Lisa Solomon
(74) *Attorney, Agent, or Firm* — SOLARIS Intellectual Property Group, PLLC

(57) ABSTRACT

Provided are a textile printing ink set including a pretreatment liquid including a cationic compound having a molecular weight per cationic valence of 150 to 220, and an ink composition including a water-insoluble dye, a dispersing agent, and water, wherein the dispersing agent is at least one selected from the group consisting of a urethane resin, a urea resin, and a urethane-urea resin; and a textile printing method.

11 Claims, 1 Drawing Sheet

(51) Int. Cl.
| | |
|---|---|
| *B41M 5/00* | (2006.01) |
| *C09D 11/033* | (2014.01) |
| *C09D 11/037* | (2014.01) |
| *C09D 11/328* | (2014.01) |
| *C09D 11/54* | (2014.01) |
| *D06P 1/16* | (2006.01) |
| *D06P 1/22* | (2006.01) |
| *D06P 3/60* | (2006.01) |
| *D06P 5/00* | (2006.01) |
| *D06P 5/30* | (2006.01) |

(52) U.S. Cl.
CPC .......... *C09D 11/033* (2013.01); *C09D 11/037* (2013.01); *C09D 11/328* (2013.01); *C09D 11/54* (2013.01); *D06P 3/6025* (2013.01); *D06P 3/6033* (2013.01); *D06P 5/002* (2013.01); *D06P 5/30* (2013.01); *D06P 1/16* (2013.01); *D06P 1/22* (2013.01)

(58) Field of Classification Search
CPC ... C09D 11/106; B41J 3/4078; B41M 5/0023; B41M 5/0017; B41M 5/0047; B41M 5/0064; D06P 3/6025; D06P 3/6033; D06P 5/002; D06P 5/30; D06P 1/16; D06P 1/22; D06P 1/5242; D06P 1/56; D06P 5/225; D06P 1/5285; D06P 3/60
See application file for complete search history.

(56) References Cited

U.S. PATENT DOCUMENTS

| | | |
|---|---|---|
| 2015/0258833 A1 | 9/2015 | Katsuragi |
| 2020/0115576 A1 | 4/2020 | Kodama et al. |

FOREIGN PATENT DOCUMENTS

| | | |
|---|---|---|
| JP | 2003-011486 A | 1/2003 |
| JP | 2006-501376 A | 1/2006 |
| JP | 2006-124843 A | 5/2006 |
| JP | 2006-342455 A | 12/2006 |
| JP | 2012-511615 A | 5/2012 |
| JP | 2012-126056 A | 7/2012 |
| JP | 2015-193230 A | 11/2015 |
| JP | 2019-108423 A | 7/2019 |
| WO | 2018/043414 A1 | 3/2018 |
| WO | 2019/004327 A1 | 1/2019 |

OTHER PUBLICATIONS

Machine Translation of (WO 2019004327) "Inkjet ink for textile printing, Ink cartridge, Ink set, and Inkjet Textile printing method", Jan. 3, 2019, [Abstract, Whole Document] (Year: 2019).*
Cellulose Fiber—Wikipedia Article, See section "Types", [retrieved on Oct. 26, 2023] (Year: 2023).*
PolyDADMAC, Wikipedia Article, [Paragraph 0001], [retrieved on Oct. 26, 2023] (Year: 2023).*
Interfacial electrostatics of poly(vinylamine hydrochloride), poly (diallyldimethyl ammonium chloride), poly-l-lysine, and poly-l-arginine interacting with lipid bilayers, Abstrat, [Apr. 25, 2018] (Year: 2018).*
Senka corporation—fact sheet for speciality polymers, [retrieved on Oct. 26, 2023] (Year: 2023).*
English language translation of the following: Office action dated Apr. 4, 2023 from the JPO in a Japanese patent application No. 2021-551164 corresponding to the instant patent application.
International Search Report issued in International Application No. PCT/JP2020/036091 dated Dec. 1, 2020.
Written Opinion of the ISA issued in International Application No. PCT/JP2020/036091 dated Dec. 1, 2020.

* cited by examiner

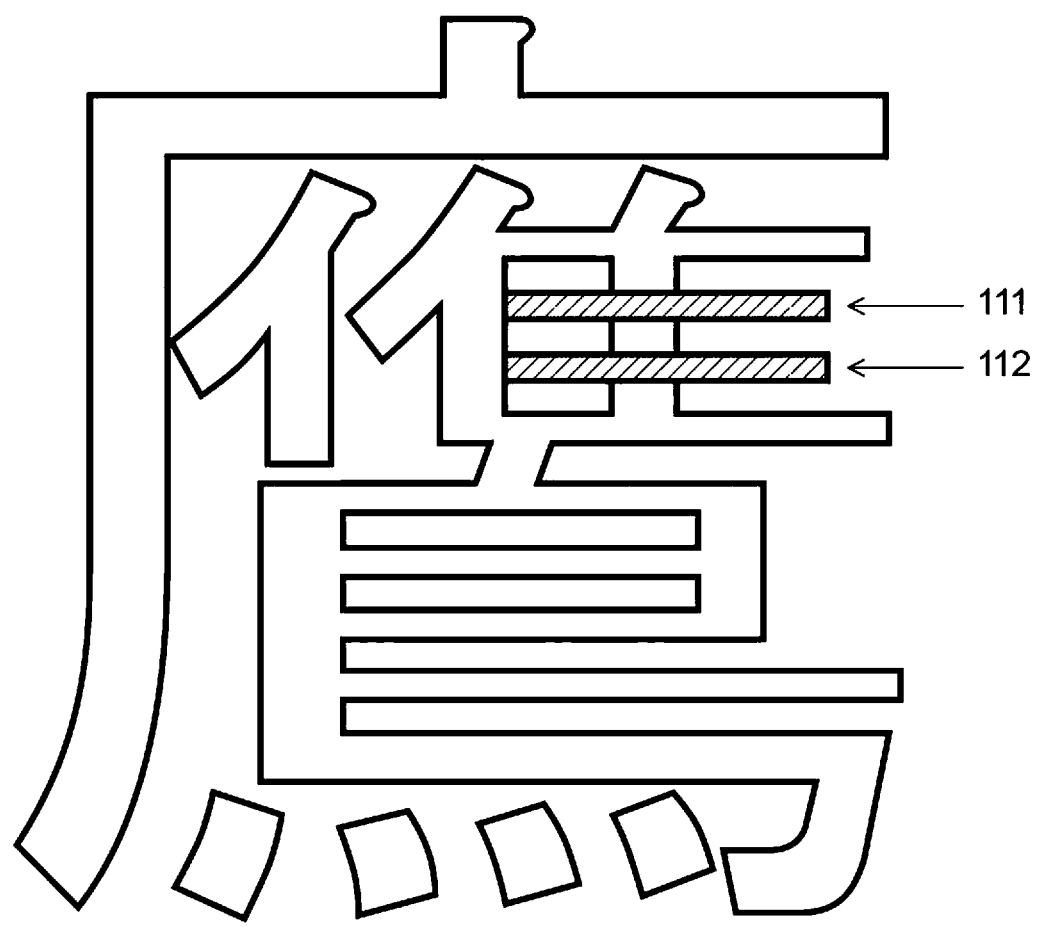

TEXTILE PRINTING INK SET AND TEXTILE PRINTING METHOD

CROSS-REFERENCE TO RELATED APPLICATIONS

This application is a Continuation of International Application No. PCT/JP2020/036091, filed Sep. 24, 2020, which claims priority to Japanese Patent Application No. 2019-180586, filed Sep. 30, 2019. Each of the above applications is hereby expressly incorporated by reference, in its entirety, into the present application.

BACKGROUND OF THE INVENTION

1. Field of the Invention

The present disclosure relates to a textile printing ink set and a textile printing method.

2. Description of the Related Art

In these years, various studies on textile printing methods for textiles have been performed.

For example, JP2006-342455A, JP2006-124843A, JP2001-270227A, and JP2006-501376A disclose a method in which, in order to obtain a sharp image, before an ink is applied to a textile, a pretreatment liquid is applied to the textile in advance. WO2019/004327A discloses a textile printing ink jet ink including water, an aqueous organic solvent, and coloring resin particles, wherein the coloring resin particles include a urethane resin and at least one dye selected from the group consisting of an oil-soluble dye, a disperse dye, and a vat dye, and the urethane resin has an acid value of 5 to 90 mgKOH/g.

SUMMARY OF THE INVENTION

However, in some cases, printed textiles obtained by printing on textiles are desirably less likely to cause color staining of other textiles and less likely to cause bleeding. JP2006-342455A, JP2006-124843A, JP2001-270227A, JP2006-501376A, and WO2019/004327A each do not focus on achieving both of being less likely to cause color staining and less likely to cause bleeding.

Under such circumstances, the present disclosure has been made; embodiments of the present disclosure provide a textile printing ink set and a textile printing method that can provide a printed textile that is less likely to cause color staining of other textiles and less likely to cause bleeding.

The present disclosure includes the following embodiments.
- <1> A textile printing ink set including a pretreatment liquid including a cationic compound having a molecular weight per cationic valence of 150 to 220, and an ink composition including a water-insoluble dye, a dispersing agent, and water, wherein the dispersing agent is at least one selected from the group consisting of a urethane resin, a urea resin, and a urethane-urea resin.
- <2> The textile printing ink set according to <1>, wherein the dispersing agent has an acid value of 15 mgKOH/g to 90 mgKOH/g.
- <3> The textile printing ink set according to <1> or <2>, wherein the cationic compound is at least one selected from the group consisting of a condensation product between dicyandiamide and alkylamine, a condensation product between dicyandiamide and formaldehyde, a polymer including, as a monomeric unit, diallyldimethylammonium chloride, and a polymer including, as a monomeric unit, methyldiallylamine acetic acid salt.
- <4> The textile printing ink set according to any one of <1> to <3>, wherein the cationic compound has a weight-average molecular weight of 10,000 to 200,000.
- <5> The textile printing ink set according to any one of <1> to <4>, wherein a ratio of a weight-average molecular weight of the cationic compound to a weight-average molecular weight of the dispersing agent is 1.5 to 15.
- <6> The textile printing ink set according to any one of <1> to <5>, wherein the pretreatment liquid further includes a solvent having a boiling point of 240° C. or more, and a content of the solvent relative to a total amount of the pretreatment liquid is 14 mass % to 50 mass %.
- <7> The textile printing ink set according to any one of <1> to <6>, wherein the pretreatment liquid further includes a surfactant.
- <8> The textile printing ink set according to any one of <1> to <7>, wherein the water-insoluble dye is at least one dye selected from the group consisting of an oil-soluble dye, a disperse dye, and a vat dye.
- <9> The textile printing ink set according to any one of <1> to <8>, wherein the water-insoluble dye is C.I. Solvent Black 3.
- <10> A textile printing method including a pretreatment liquid application step of applying the pretreatment liquid included in the ink set according to any one of <1> to <9>, to a textile; and an ink application step of applying the ink composition included in the ink set according to any one of <1> to <9>, to the textile to which the pretreatment liquid has been applied.
- <11> The textile printing method according to <10>, wherein, in the pretreatment liquid application step, the pretreatment liquid is applied by an ink jet recording process.
- <12> The textile printing method according to <10> or <11>, wherein, in the ink application step, the ink composition is applied by an ink jet recording process.
- <13> The textile printing method according to any one of <10> to <12>, wherein the textile is cellulose fiber.

Embodiments of the present disclosure can provide a textile printing ink set and a textile printing method that can provide a printed textile that is less likely to cause color staining of other textiles and less likely to cause bleeding.

BRIEF DESCRIPTION OF THE DRAWING

FIG. 1 is an explanatory view of, in EXAMPLES, evaluation ranks for bleeding.

DESCRIPTION OF THE PREFERRED EMBODIMENTS

Hereinafter, the ink set and the textile printing method according to the present disclosure will be described in detail.

In this Specification, numerical ranges described as "a value 'to' another value" mean ranges including the value and the other value respectively as the minimum value and the maximum value.

In this Specification, among numerical ranges described in series, the upper limit value or the lower limit value of a numerical range may be replaced by the upper limit value or the lower limit value of one of other numerical ranges described in series. In this Specification, among numerical ranges, the upper limit value or the lower limit value of a numerical range may be replaced by a value described in Examples.

In this Specification, the amount of each of components in a composition means, when the composition contains a plurality of substances belonging to such a component, the total amount of the plurality of substances in the composition unless otherwise specified.

In this Specification, combinations of two or more preferred embodiments are more preferred embodiments.

In this Specification, the term "step" includes not only an independent step, but also a step that is not clearly distinguished from another step but that achieves the intended result of the step.

Textile Printing Ink Set

The textile printing ink set according to the present disclosure (hereafter, simply referred to as "ink set") has a pretreatment liquid including a cationic compound having a molecular weight per cationic valence of 150 to 220, and an ink composition including a water-insoluble dye, a dispersing agent, and water, wherein the dispersing agent is at least one selected from the group consisting of a urethane resin, a urea resin, and a urethane-urea resin.

The pretreatment liquid in the ink set according to an embodiment of the present disclosure is applied to a textile and subsequently, to the textile to which the pretreatment liquid has been applied, the ink composition in the ink set according to an embodiment of the present disclosure is applied, to thereby provide a printed textile that is less likely to cause color staining of other textiles and less likely to cause bleeding.

In the related art, when an ink containing a dye and a dispersing agent is used to perform textile printing, washing results in a phenomenon of color staining of other textiles, in particular, nylon in some cases. As a technique of suppressing color staining, there is a known technique of applying a pretreatment liquid including a large amount of a cationic polymer to a textile in advance. However, the application of the pretreatment liquid including a large amount of a cationic polymer to a textile results in a phenomenon in which the cationic polymer causes the water-insoluble dye to move to cause bleeding in some cases. In particular, in regions where reverse type is formed and the ink drop volume is large, bleeding is noticeable. Therefore, it has been difficult to obtain a printed textile that is less likely to cause color staining of other textiles and less likely to cause bleeding.

By contrast, in the ink set according to an embodiment of the present disclosure, the pretreatment liquid includes a cationic compound having a molecular weight per cationic valence of 150 to 220, and this cationic compound reacts with, on the textile, the dispersing agent included in the ink composition in the ink set according to an embodiment of the present disclosure. The cationic compound turns the dispersing agent to be insoluble in water, and the water-insoluble dye aggregates on the textile and is fixed. High fixability on the textile is exhibited, which inferentially results in being less likely to cause color staining of other textiles and less likely to cause bleeding.

Hereinafter, components included in the ink set according to the present disclosure will be described.

Pretreatment Liquid

In the present disclosure, the pretreatment liquid includes a cationic compound having a molecular weight per cationic valence of 150 to 220. The pretreatment liquid may include a single cationic compound, or two or more cationic compounds.

Cationic Compound

The cationic compound is not particularly limited as long as it is a compound having a cationic group, and may be, for example, a compound including at least one species selected from the group consisting of a primary amino group, a secondary amino group, a tertiary amino group, and an onium salt. Examples of the onium salt include sulfonium salt, iodonium salt, phosphonium salt, and ammonium salt. Of these, the onium salt is preferably ammonium salt.

The cationic compound has a molecular weight per cationic valence of 150 to 220, preferably 160 to 210. When it has a molecular weight per cationic valence of 150 or more, it has lowered water-solubility, to provide a printed textile that is less likely to cause color staining of other textiles. When it has a molecular weight per cationic valence of 220 or less, it provides strongly the effect of reacting with the dispersing agent included in the ink set according to the present disclosure to aggregate the water-insoluble dye, to provide a printed textile that is less likely to cause bleeding.

In the pretreatment liquid, the molecular weight per cationic valence of the cationic compound can be measured by, for example, the following method.

First, in the case where the pretreatment liquid includes, as described below, water and an aqueous organic solvent, these are removed by heat treatment, for example. Subsequently, from the solid content included in the pretreatment liquid, the cationic compound is extracted using a gel permeation chromatograph (GPC). The nuclear magnetic resonance (NMR) method is used to analyze the structure of the cationic compound, and to measure the molecular weight per cationic valence.

In the pretreatment liquid, the content of the cationic compound can be calculated by, for example, the following method.

First, in the case where the pretreatment liquid includes, as described below, water and an aqueous organic solvent, these are removed by heat treatment, for example. Subsequently, from the solid content included in the pretreatment liquid, the cationic compound is extracted using a GPC. On the basis of the amount of the pretreatment liquid and the amount of the cationic compound, the content of the cationic compound in the pretreatment liquid is calculated.

For the cationic compound, as long as the molecular weight per cationic valence is 150 to 220, the molecular weight of the compound as a whole is not particularly limited; the compound may be a low-molecular-weight compound (a compound having a weight-average molecular weight of less than 10,000) or a high-molecular-weight compound (a compound having a weight-average molecular weight of 10,000 or more). From the viewpoint of providing a printed textile that is even less likely to cause color staining of other textiles and is even less likely to cause bleeding, the cationic compound preferably has a weight-average molecular weight of 10,000 to 200,000, more preferably 20,000 to 100,000.

In the present disclosure, the weight-average molecular weight and the number-average molecular weight can be measured using a gel permeation chromatograph (GPC). Specifically, the measurement method is as follows. As the GPC, a product named "HLC-8020GPC" and manufactured by Tosoh Corporation is used; as the columns, three columns of a product named "TSKgel, SuperMultipore HZ-H" (4.6 mmID×15 cm) and manufactured by Tosoh Corporation are used; as the eluant, THF (tetrahydrofuran) is used. The measurement is performed at a sample concentration of 0.45 mass %, at a flow rate of 0.35 ml/min, at a sample injection amount of 10 μl, at a measurement temperature of 40° C., and with an RI (Refractive index) Detector. The calibration curve is created using, as standard samples, 8 samples of products manufactured by Tosoh Corporation and named "TSK polystyrene standards": "F-40", "F-20", "F-4", "F-1", "A-5000", "A-2500", "A-1000", and "n-propylbenzene".

The cationic compound having a molecular weight per cationic valence of 150 to 220 is, specifically, preferably at least one selected from the group consisting of a condensation product of dicyandiamide and alkylamine, a condensation product of dicyandiamide and formaldehyde, a polymer including, as a monomeric unit, diallyldimethylammonium chloride, and a polymer including, as a monomeric unit, methyldiallylamine acetic acid salt, more preferably at least one selected from the group consisting of a condensation product of dicyandiamide and alkylamine, and a polymer including, as a monomeric unit, diallyldimethylammonium chloride.

Examples of the condensation product of dicyandiamide and alkylamine include a dicyandiamide-diethylenetriamine condensation product.

The polymer including, as a monomeric unit, diallyldimethylammonium chloride may be a homopolymer composed only of diallyldimethylammonium chloride, or may be a copolymer composed of diallyldimethylammonium chloride and another monomeric unit. Examples of the copolymer include a diallyldimethylammonium chloride-acrylamide copolymer.

The polymer including, as a monomeric unit, methyldiallylamine acetic acid salt may be a homopolymer composed only of methyldiallylamine acetic acid salt, or may be a copolymer composed of methyldiallylamine acetic acid salt and another monomeric unit.

Examples of the cationic compound having a molecular weight per cationic valence of 150 to 220 include low-molecular-weight compounds such as trimethylphenylammonium chloride and tetraethylammonium chloride.

The pH of a 1 mass % aqueous solution of the cationic compound is, from the viewpoint of, in the case of applying the pretreatment liquid by an ink jet recording process, suppressing corrosion of members (for example, an ink jet head) in the ink jet recording apparatus used, preferably 4 to 8.

The pH is a value measured using a pH meter (for example, a product named "WM-50EG" and manufactured by DKK-TOA CORPORATION) at 25° C.

In the pretreatment liquid, the content of the cationic compound relative to the total amount of the pretreatment liquid is preferably 5 mass % to 20 mass %, more preferably 8 mass % to 15 mass %. When the content of the cationic compound is 5 mass % or more, the effect of reacting with the dispersing agent included in the ink set according to the present disclosure to aggregate the water-insoluble dye is strongly exerted, to provide a printed textile that is even less likely to cause bleeding. When the content of the cationic compound is 20 mass % or less, movement of the water-insoluble dye due to the cationic compound is suppressed, to provide a printed textile that is even less likely to cause bleeding.

Water

The pretreatment liquid preferably includes water. In the pretreatment liquid, the water content relative to the total amount of the pretreatment liquid is preferably 40 mass % or more, more preferably 50 mass % or more, still more preferably 60 mass % or more, particularly preferably 80 mass % or more. The water content relative to the total amount of the pretreatment liquid is preferably 98 mass % or less, more preferably 95 mass % or less.

Solvent

The pretreatment liquid may include at least one solvent. The solvent is preferably an aqueous organic solvent.

In the aqueous organic solvent, "aqueous" means that the amount of the solvent soluble in 100 g of distilled water at 25° C. is more than 1 g. This amount of the aqueous organic solvent soluble is preferably 5 g or more, more preferably 10 g or more, still more preferably 20 g or more.

In the case of applying the pretreatment liquid by an ink jet recording process, from the viewpoint of ejection performance, the solvent is preferably a solvent having a boiling point of 240° C. or more. The content of the solvent having a boiling point of 240° C. or more is, from the viewpoint of ejection performance, relative to the total amount of the pretreatment liquid, preferably 14 mass % to 50 mass %, more preferably 15 mass % to 30 mass %.

The boiling point of the solvent can be measured with a boiling point measurement device; for example, a product named "Dosa Therm 300" and manufactured by Titan Technologies, K.K. can be used for the measurement. Note that the boiling point means a boiling point at 1 atm (101325 Pa).

Examples of the solvent include alcohol-based solvents, amide-based solvents, nitrile-based solvents, polyalkylene glycol-based solvents, and polyalkylene glycol alkyl ether-based solvents; preferred are alcohol-based solvents and amide-based solvents.

Examples of the solvent having a boiling point of 240° C. or more include polyhydric alcohols such as diethylene glycol (boiling point: 244° C.), 1,6-hexanediol (boiling point: 250° C.), 2-ethyl-1,3-hexanediol (boiling point: 243° C.), triethylene glycol (boiling point: 287° C.), tripropylene glycol (boiling point: 273° C.), tetraethylene glycol (boiling point: 314° C.), and glycerol (boiling point: 290° C.);

polyhydric alcohol alkyl ethers such as triethylene glycol methyl ether (boiling point: 249° C.), tripropylene glycol methyl ether (boiling point: 243° C.), triethylene glycol ethyl ether (boiling point: 256° C.), diethylene glycol-n-hexyl ether (boiling point: 259° C.), and tripropylene glycol-n-propyl ether (boiling point: 261° C.);

polyhydric alcohol aryl ethers such as propylene glycol phenyl ether (boiling point: 243° C.), and ethylene glycol monobenzyl ether (boiling point: 256° C.); and nitrogen-containing compounds such as 2-pyrrolidone (boiling point: 245° C.). In particular, from the viewpoint of preservation stability and ejection performance, the solvent is preferably glycerol or 2-pyrrolidone. The pretreatment liquid may include a single solvent having a boiling point of 240° C. or more, or two or more solvents having a boiling point of 240° C. or more.

Examples of a solvent having a boiling point of less than 240° C. include polyhydric alcohols such as ethylene glycol (boiling point: 198° C.), propylene glycol (boiling point: 188° C.), 1,2-butanediol (boiling point: 194° C.), 2,3-butanediol (boiling point: 183° C.), 2-methyl-1,3-propanediol (boiling point: 214° C.), 2-methyl-2,4-pentanediol (boiling point: 198° C.), 1,2,6-hexanetriol (boiling point: 178° C.), 1,2,3-butanetriol (boiling point: 175° C.), 1,2,4-butanetriol (boiling point: 170° C.), dipropylene glycol (boiling point: 231° C.), 1,3-propanediol (boiling point: 214° C.), 1,3-butanediol (boiling point: 208° C.), 1,4-butanediol (boiling point: 230° C.), 1,2-pentanediol (boiling point: 206° C.), 2,4-pentanediol (boiling point: 201° C.), 2-methyl-1,3-butanediol (boiling point: 203° C.), 3-methyl-1,3-butanediol (boiling point: 203° C.), 1,5-pentanediol (boiling point: 242° C.), 2,2-dimethyl-1,3-propanediol (boiling point: 208° C.), 1,2-hexanediol (boiling point: 223° C.), and 2,5-hexanediol (boiling point: 217° C.);

polyhydric alcohol alkyl ethers such as ethylene glycol monoethyl ether (boiling point: 135° C.), ethylene glycol-n-propyl ether (boiling point: 150° C.), ethylene glycol monobutyl ether (boiling point: 171° C.), propylene glycol monoethyl ether (boiling point: 133° C.), propylene glycol-n-butyl ether (boiling point: 171° C.), propylene glycol-t-butyl ether (boiling point: 153° C.), tetraethylene glycol monomethyl ether (boiling point: 159° C.), diethylene glycol methyl ether (boiling point: 194° C.), diethylene glycol-n-butyl ether (boiling point: 171° C.), dipropylene glycol monomethyl ether (boiling point: 188° C.), diethylene glycol monoethyl ether (boiling point: 202° C.), diethylene glycol monobutyl ether (boiling point: 230° C.), triethylene glycol methyl ether (boiling point: 249° C.), and dipropylene glycol-n-propyl ether (boiling point: 213° C.);

polyhydric alcohol aryl ethers such as ethylene glycol phenyl ether (boiling point: 237° C.); and nitrogen-containing compounds such as ε-caprolactam (boiling point: 137° C.), N-methylformamide (boiling point: 199° C.), N,N-dimethylformamide (boiling point: 153° C.), N-methyl-2-pyrrolidone (boiling point: 204° C.), 1,3-dimethylimidazolidinone (boiling point: 220° C.), and N-methylpyrrolidinone (boiling point: 202° C.).

When the pretreatment liquid contains a solvent, the content of the solvent in the pretreatment liquid relative to the total amount of the pretreatment liquid is preferably 1 mass % to 50 mass %, more preferably 5 mass % to 40 mass %, still more preferably 10 mass % to 30 mass %.

Surfactant

The pretreatment liquid preferably includes a surfactant. In particular, in the case of applying the pretreatment liquid by an ink jet recording process, the pretreatment liquid including a surfactant exhibits high ejection performance.

The surfactant is not particularly limited, and publicly known surfactants such as silicone-based surfactants, fluorosurfactants, and acetylene glycol-based surfactants are usable.

When the pretreatment liquid according to the present disclosure contains a surfactant, the surfactant content relative to the total amount of the pretreatment liquid is preferably 0.05 mass % to 2.0 mass %, more preferably 0.1 mass % to 2.0 mass %.

Other Aggregation Agent

The cationic compound functions as an aggregation agent that aggregates the water-insoluble dye in the ink composition. The pretreatment liquid may include, in addition to the cationic compound, at least one other aggregation agent. Examples of the other aggregation agent include polyvalent metallic salts.

The polyvalent metallic salts are compounds constituted by a di- or higher valent metallic ion and an anion. Specific examples of the polyvalent metallic salts include calcium chloride, calcium nitrate, calcium sulfate, calcium acetate, calcium hydroxide, calcium carbonate, magnesium chloride, magnesium acetate, magnesium sulfate, magnesium carbonate, barium sulfate, barium chloride, zinc sulfide, zinc carbonate, and copper nitrate.

Other Component

The pretreatment liquid may include, in addition to the above-described components, another component. Examples of the other component include a pH adjusting agent, a fluorescent brightening agent, a surface tension modifier, an anti-foaming agent, an anti-drying agent, a lubricant, a thickener, an ultraviolet absorbent, an anti-fading agent, an antistatic agent, a matting agent, an anti-oxidant, a resistivity control agent, an anticorrosive, a reduction inhibitor, a preservative, a fungicide, and a chelating agent.

Ink Composition

In the present disclosure, the ink composition includes a water-insoluble dye, a dispersing agent, and water. The ink composition may include, as needed, another component.

Water-Insoluble Dye

The ink composition includes a water-insoluble dye. The ink composition may include a single water-insoluble dye, or two or more water-insoluble dyes.

In the water-insoluble dye, "water-insoluble" means a property of having a solubility in water at 20° C. of 1 mass % or less. Thus, in the present disclosure, the water-insoluble dye means a dye having a solubility in water at 20° C. of 1 mass % or less.

The water-insoluble dye is preferably at least one dye selected from the group consisting of an oil-soluble dye, a disperse dye, and a vat dye. Examples of the oil-soluble dye, the disperse dye, and the vat dye will be described below. Note that "C.I." is the abbreviation of "Colour Index". The dyes described with "Disperse" are disperse dyes. The dyes described with "Solvent" are oil-soluble dyes. The dyes described with "Vat" are vat dyes.

Examples of the oil-soluble dyes include

C.I. Solvent Yellow 2, 14, 16, 21, 33, 43, 44, 56, 82, 85, 93, 98, 114, 131, 135, 157, 160, 163, 167, 176, 179, 185, 189;

C.I. Solvent Red 8, 23, 24, 25, 49, 52, 109, 111, 119, 122, 124, 135, 146, 149, 150, 168, 169, 172, 179, 195, 196, 197, 207, 222, 227, 312, 313;

C.I. Solvent Blue 3, 4, 5, 35, 36, 38, 44, 45, 59, 63, 67, 68, 70, 78, 83, 97, 101, 102, 104, 105, 111, 122;

C.I. Solvent Orange 3, 14, 54, 60, 62, 63, 67, 86, 107;

C.I. Solvent Violet 8, 9, 11, 13, 14, 26, 28, 31, 36, 59;

C.I. Solvent Green 3, 5, 7, 28;

C.I. Solvent Brown 53; and

C.I. Solvent Black 3, 5, 7, 27, 28, 29, 34.

Examples of the disperse dyes include

C.I. Disperse Yellow 3, 7, 8, 23, 39, 51, 54, 60, 71, 86;

C.I. Disperse Red 11, 50, 53, 55, 55:1, 59, 60, 65, 70, 75, 93, 146, 158, 190, 190:1, 207, 239, 240;

C.I. Disperse Blue 3, 5, 19, 26, 26:1, 35, 55, 56, 58, 64, 64:1, 72, 72:1, 81, 81:1, 91, 95, 108, 131, 141, 145, 359, 360;

C.I. Disperse Orange 1, 1:1, 5, 7, 20, 23, 25, 25:1, 33, 56, 76;

C.I. Disperse Violet 8, 11, 17, 23, 26, 27, 28, 29, 36, 57; and

C.I. Disperse Brown 2.

Examples of the vat dyes include

C.I. Vat Yellow 2, 4, 10, 20, 33;

C.I. Vat Orange 1, 2, 3, 5, 7, 9, 13, 15;

C.I. Vat Red 1, 2, 10, 13, 15, 16, 41, 61;

C.I. Vat Blue 1, 3, 4, 5, 6, 8, 12, 14, 18, 19, 20, 29, 35, 41; and

C.I. Vat Black 1, 8, 9, 13, 14, 20, 25, 27, 29, 36, 56, 57, 59, 60.

The water-insoluble dye may be an oil-soluble dye obtained by making a reactive dye or an acid dye be oil-soluble.

The oil-soluble dye obtained by making a reactive dye be oil-soluble is, for example, an oil-soluble dye obtained by modifying a reactive dye with an alkyl group having 4 or more carbon atoms. The reactive dye employed for being made to be oil-soluble is, for example, C.I. Reactive Black 5.

The oil-soluble dye obtained by making an acid dye be oil-soluble is, for example, an oil-soluble dye obtained by subjecting the cation in the acid dye to exchange of counter cations using a cation having 8 or more carbon atoms. The acid dye employed for being made to be oil-soluble is, for example, C.I. Acid Black 1.

One of preferred forms of the oil-soluble dye may be an oil-soluble dye represented by Formula (D1) below.

The oil-soluble dye represented by Formula (D1) includes the dye skeleton in a water-soluble reactive dye C.I. Reactive Black 5 and includes the dye skeleton in an acid dye C.I. Acid Black 1. The oil-soluble dye represented by Formula (D1) can be obtained by making C.I. Reactive Black 5 or C.I. Acid Black 1 be oil-soluble.

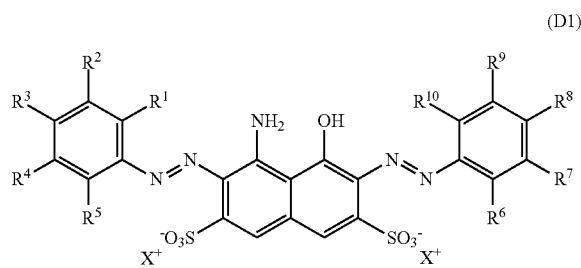

(D1)

In Formula (D1), $R^1$ to $R^{10}$ each independently represent a hydrocarbon group that has 1 to 60 carbon atoms and that may include an oxygen atom, a nitrogen atom, a sulfur atom, or a chlorine atom, a hydrogen atom, a chlorine atom, a nitro group, an amino group, a sulfo group, or a salt of a sulfo group, and two $X^+$'s each independently represent an inorganic cation or an organic cation.

Note that at least one of the following is satisfied: at least one of $R^1$ to $R^{10}$ is a group including an alkyl group having 4 or more carbon atoms, or at least one of two $X^+$'s is an organic cation including an alkyl group having 4 or more carbon atoms.

In Formula (D1), in each of $R^1$ to $R^{10}$, the hydrocarbon group that has 1 to 60 carbon atoms and that may include an oxygen atom, a nitrogen atom, a sulfur atom, or a chlorine atom means an organic group that includes a carbon atom and a hydrogen atom, that may include an oxygen atom, a nitrogen atom, a sulfur atom, or a chlorine atom, and has 1 to 60 carbon atoms in total.

In each of $R^1$ to $R^{10}$, the hydrocarbon group that may include an oxygen atom, a nitrogen atom, a sulfur atom, or a chlorine atom may be a hydrocarbon group not including an oxygen atom, a nitrogen atom, a sulfur atom, or a chlorine atom.

The hydrocarbon group not including an oxygen atom, a nitrogen atom, a sulfur atom, or a chlorine atom may be, for example, an alkyl group, an alkenyl group, an alkynyl group, an aryl group, an aralkyl group, or an alkylaryl group.

The concept of the hydrocarbon group including an oxygen atom encompasses, for example, hydroxyalkyl groups, alkoxy groups, alkoxyalkyl groups, alkylcarbonyl groups, and alkylcarbonyloxy groups.

The concept of the hydrocarbon group including a nitrogen atom encompasses, for example, alkylamino groups (specifically, monoalkylamino groups or dialkylamino groups), and alkylaminoalkyl groups.

The concept of the hydrocarbon group including a sulfur atom encompasses, for example, thioalkyl groups and alkylthio groups.

The concept of the hydrocarbon group including an oxygen atom and a sulfur atom encompasses, for example, alkylsulfonyl groups, arylsulfonyl groups, alkoxyalkylthio groups, alkylthioalkylsulfonyl groups, and alkoxyalkylsulfonyl groups.

The concept of the hydrocarbon group including an oxygen atom, a nitrogen atom, and a sulfur atom encompasses, for example, alkoxyalkylaminoalkylsulfonyl groups and alkylaminoalkylsulfonyl groups.

The concept of the hydrocarbon group including a chlorine atom encompasses groups provided by replacing hydrogen atoms in the above-described specific examples by chlorine atoms.

In each of $R^1$ to $R^{10}$, the hydrocarbon group that has 1 to 60 carbon atoms and that may include an oxygen atom, a nitrogen atom, a sulfur atom, or a chlorine atom preferably has 1 to 50 carbon atoms.

In each of $R^1$ to $R^{10}$, the hydrocarbon group that has 1 to 60 carbon atoms and that may include an oxygen atom, a nitrogen atom, a sulfur atom, or a chlorine atom is preferably a hydrocarbon group that has 1 to 60 (more preferably 1 to 50) carbon atoms and that may include an oxygen atom, a nitrogen atom, or a sulfur atom.

In each of $R^1$ to $R^{10}$, the hydrocarbon group that has 1 to 60 carbon atoms and that may include an oxygen atom, a nitrogen atom, a sulfur atom, or a chlorine atom preferably includes a sulfonyl group.

In each of $R^1$ to $R^{10}$, the hydrocarbon group that has 1 to 60 carbon atoms and that may include an oxygen atom, a nitrogen atom, a sulfur atom, or a chlorine atom is particularly preferably an alkylthioalkylsulfonyl group, an alkoxyalkylsulfonyl group, an alkoxyalkylaminoalkylsulfonyl group (specifically, a mono(alkoxyalkyl)aminoalkylsulfonyl group or a di(alkoxyalkyl)aminoalkylsulfonyl group), or an alkylaminoalkylsulfonyl group (specifically, a monoalkylaminoalkylsulfonyl group or a dialkylaminoalkylsulfonyl group).

$R^1$ to $R^{10}$ may each be independently a hydrogen atom, a chlorine atom, a nitro group, an amino group, a sulfo group, or a salt of a sulfo group.

The salt of a sulfo group is preferably an alkali metal salt.

Two $X^+$'s represent an inorganic cation or an organic cation.

The inorganic cation is preferably an alkali metal ion, more preferably $K^+$ or $Na^+$.

The organic cation is preferably an organic ammonium ion.

Formula (D1) satisfies at least one of the following: at least one (more preferably at least two) of $R^1$ to $R^{10}$ is a group including an alkyl group having 4 or more carbon atoms, or at least one (more preferably two) of two $X^+$'s is an organic cation including an alkyl group having 4 or more carbon atoms.

In Formula (D1), for the "group including an alkyl group having 4 or more carbon atoms", the group as a whole preferably has 4 to 60, more preferably 4 to 50, still more preferably 4 to 30, particularly preferably 4 to 25 carbon atoms.

The group including an alkyl group having 4 or more carbon atoms may be a primary amino group including an alkyl group having 4 or more carbon atoms, a secondary amino group including an alkyl group having 4 or more carbon atoms, an alkoxy group that may be substituted, or a thioalkyl group that may be substituted. In particular, the group including an alkyl group having 4 or more carbon atoms is preferably a primary amino group including an alkyl group having 4 or more carbon atoms, or a secondary amino group including an alkyl group having 4 or more carbon atoms.

In Formula (D1), the "organic cation including an alkyl group having 4 or more carbon atoms" preferably has 4 to 60, more preferably 4 to 50, still more preferably 4 to 30, particularly preferably 4 to 25 carbon atoms.

The organic cation including an alkyl group having 4 or more carbon atoms is preferably an organic ammonium ion including an alkyl group having 4 or more carbon atoms.

From the viewpoint of providing a printed textile that is less likely to cause color staining of other textiles and less likely to cause bleeding, Formula (D1) preferably has a form in which at least one of $R^1$ to $R^{10}$ is a group including an alkyl group having 4 or more carbon atoms, and two $X^+$'s are each independently $K^+$ or $Na^+$.

From the viewpoint of providing a printed textile that is less likely to cause color staining of other textiles and less likely to cause bleeding, the oil-soluble dye (D1) is preferably an oil-soluble dye (D2) represented by the following Formula (D2).

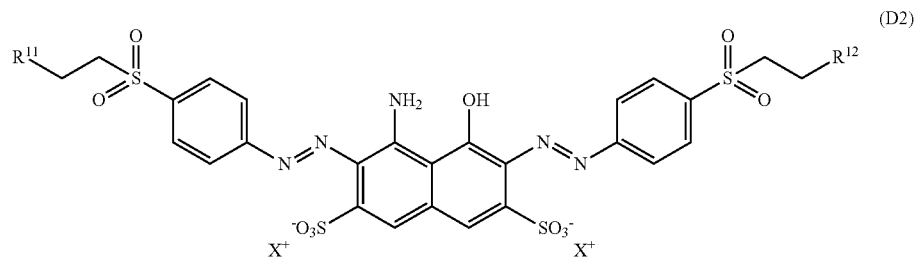

In Formula (D2), $R^{11}$ and $R^{12}$ each independently represent a hydrocarbon group that has 1 to 50 carbon atoms and that may include an oxygen atom, a nitrogen atom, or a sulfur atom, and two $X^+$'s represent an inorganic cation or an organic cation.

Note that at least one of the following is satisfied: at least one (more preferably two) of $R^{11}$ or $R^{12}$ is a group including an alkyl group having 4 or more carbon atoms, or at least one (more preferably two) of two $X^+$'s is an organic cation including an alkyl group having 4 or more carbon atoms.

For preferred examples of groups and cations in Formula (D2), reference can be appropriately made to preferred examples of groups and cations in Formula (D1).

From the viewpoint of providing a printed textile that is less likely to cause color staining of other textiles and less likely to cause bleeding, Formula (D2) preferably has a form in which at least one (more preferably two) of $R^{11}$ or $R^{12}$ is a group including an alkyl group having 4 or more carbon atoms, two $X^+$'s are each independently $K^+$ or $Na^+$.

From the viewpoint of providing a printed textile that is less likely to cause color staining of other textiles and less likely to cause bleeding, the oil-soluble dye (D1) is more preferably an oil-soluble dye (D3) represented by the following Formula (D3).

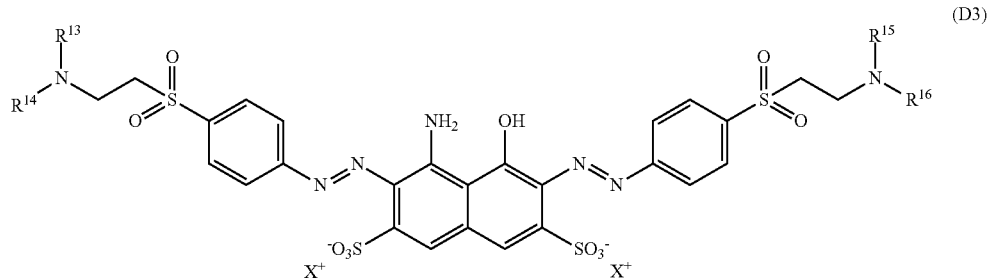

In Formula (D3), $R^{13}$ to $R^{16}$ each independently represent a hydrocarbon group that has 1 to 25 carbon atoms and that may include an oxygen atom, a nitrogen atom, or a sulfur atom or a hydrogen atom, and two $X^+$'s represent an inorganic cation or an organic cation. Note that at least one of the following is satisfied: at least one (more preferably at least two) of $R^{13}$ to $R^{16}$ is a group including an alkyl group having 4 or more carbon atoms, or at least one (more preferably two) of two $X^+$'s is an organic cation including an alkyl group having 4 or more carbon atoms.

For preferred examples of groups and cations in Formula (D3), reference can be appropriately made to preferred examples of groups and cations in Formula (D1).

From the viewpoint of providing a printed textile that is less likely to cause color staining of other textiles and less likely to cause bleeding, Formula (D3) preferably has a form in which at least one (more preferably at least two) of $R^{13}$ to $R^{16}$ is a group including an alkyl group having 4 or more carbon atoms, and two $X^+$'s are each independently $K^+$ or $Na^+$.

The water-insoluble dye is preferably C.I. Solvent Black 3 or C.I. Solvent Black 28. In particular, from the viewpoint of the optical density of the resultant printed textile and the temporal stability of the ink composition, more preferred is C.I. Solvent Black 3.

In the ink composition, the content of the water-insoluble dye is, from the viewpoint of improving the optical density of the printed textile, relative to the total amount of the ink composition, preferably 1 mass % to 10 mass %, more preferably 2 mass % to 8 mass %, still more preferably 3 mass % to 7 mass %.

Dispersing Agent

The ink composition includes a dispersing agent. The dispersing agent, which is not particularly limited as long as it is a polymer that can disperse a water-insoluble dye, from the viewpoint of dispersion stability, preferably includes at least one species of a hydrophilic group.

The hydrophilic group is preferably an anionic group or a nonionic group and, from the viewpoint of providing a strong effect of improving the dispersion stability, more preferably an anionic group.

For example, of an anionic group and a nonionic group that have the same molecular weight, the anionic group provides a stronger effect of improving the dispersion stability. Thus, the anionic group, even in the case of having a low molecular weight, can exert sufficiently the effect of improving the dispersion stability.

The nonionic group may be a group having a polyether structure, and is preferably a monovalent group including a polyalkyleneoxy group.

The anionic group may be neutralized or may not be neutralized.

Examples of the unneutralized anionic group include a carboxy group, a sulfo group, a sulfuric acid group, a phosphonic acid group, and a phosphoric acid group.

Examples of the neutralized anionic group include a salt of a carboxy group, a salt of a sulfo group, a salt of a sulfuric acid group, a salt of a phosphonic acid group, and a salt of a phosphoric acid group.

In the present disclosure, the term "neutralized anionic group" means an anionic group in the form of a "salt" (for example, a salt of a carboxy group (for example, —COONa)).

The neutralization can be performed using, for example, an alkali metal hydroxide (for example, sodium hydroxide or potassium hydroxide) or an organic amine (for example, tri ethyl amine).

The hydrophilic group in the dispersing agent is, from the viewpoint of the dispersion stability, preferably an anionic group, more preferably at least one species selected from the group consisting of a carboxy group, a salt of a carboxy group, a sulfo group, a salt of a sulfo group, a sulfuric acid group, a salt of a sulfuric acid group, a phosphonic acid group, a salt of a phosphonic acid group, a phosphoric acid group, and a salt of a phosphoric acid group, still more preferably at least one species selected from the group consisting of a carboxy group and a salt of a carboxy group.

In the above-described salt of a carboxy group, salt of a sulfo group, salt of a sulfuric acid group, salt of a phosphonic acid group, and salt of a phosphoric acid group, "salt" is preferably an alkali metal salt or an organic amine salt, more preferably an alkali metal salt. In the alkali metal salt, the alkali metal is preferably K or Na.

The dispersing agent preferably has an acid value of 15 mgKOH/g to 90 mgKOH/g, more preferably 20 mgKOH/g to 50 mgKOH/g. The acid value is given as the number of milligrams of potassium hydroxide for neutralizing the acidic component included in 1 g of the dispersing agent. When the acid value is 15 mgKOH/g to 90 mgKOH/g, the resultant printed textile is even less likely to cause color staining of other textiles.

When the dispersing agent has, as the hydrophilic group, an anionic group, the anionic group in the dispersing agent preferably has a degree of neutralization of 50% to 100%, more preferably 70% to 90%. The term "degree of neutralization" refers to, in the dispersing agent, a ratio of "the number of neutralized anionic groups" to "the total of the number of unneutralized anionic groups (for example, carboxy groups) and the number of neutralized anionic groups (for example, salts of carboxy groups)" (specifically, Number of neutralized anionic groups/(Number of unneutralized anionic groups+Number of neutralized anionic groups)). The degree of neutralization (%) of the dispersing agent can be measured by neutralization titration.

Weight-Average Molecular Weight (Mw)

The weight-average molecular weight (Mw) of the dispersing agent is, from the viewpoint of further improving the dispersion stability of the water-insoluble dye, preferably 5000 to 50000, more preferably 6000 to 40000, still more preferably 8000 to 30000, particularly preferably 10000 to 30000.

The ratio of the weight-average molecular weight of the cationic compound to the weight-average molecular weight of the dispersing agent is preferably 1.5 to 15, more preferably 2 to 12. When the ratio is 1.5 to 15, the cationic compound and the dispersing agent react with each other to provide strongly the effect of aggregating the water-insoluble dye, and the resultant printed textile is even less likely to cause color staining of other textiles and is even less likely to cause bleeding.

Type of Dispersing Agent

Examples of a polymer used as a dispersing agent (hereafter, referred to as polymer P) include urethane resins, urea resins, urethane-urea resins, acrylic resins, polyester resins, polyether resins, polycaprolactone resins, polycarbonate resins, polybutadiene resins, polyisoprene resins, and polyolefin resins.

Such a term "urethane resin (polyurethane)" means a resin including at least one species selected from the group consisting of a urethane bond and a thiourethane bond. Such a term "urea resin (polyurea)" means a resin including a urea bond. Such a term "urethane-urea resin (polyurethane-urea)"

means a resin including at least one species selected from the group consisting of a urethane bond, a urea bond, and a thiourethane bond.

The urethane resin may include, in addition to such a bond, a polyether chain, a polyester chain, a polycaprolactone chain, a polycarbonate chain, a polybutadiene chain, a polyisoprene chain, or a polyolefin chain.

From the viewpoint of providing a printed textile that is less likely to cause color staining of other textiles and less likely to cause bleeding, the polymer P is at least one selected from the group consisting of a urethane resin, a urea resin, and a urethane-urea resin, preferably at least one selected from the group consisting of a urethane resin and a urethane-urea resin. The polymer P preferably includes a structural unit represented by Formula (1) below (hereafter, also referred to as "Unit (1)"), and a structural unit represented by Formula (2) below (hereafter, also referred to as "Unit (2)").

Structural Unit Represented by Formula (1) (Unit (1))

When the polymer P includes the structural unit represented by Formula (1) below (hereafter, also referred to as "Unit (1)"), the polymer P may include a single species of Unit (1) alone, or may include two or more species of Unit (1).

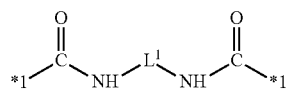

(1)

In Formula (1), $L^1$ represents a hydrocarbon group, and two *1's each represent a bonding site.

Unit (1) is preferably bonded to at least the structural unit represented by Formula (2) (hereafter, also referred to as "Unit (2)").

The hydrocarbon group represented by $L^1$ is not particularly limited.

The hydrocarbon group represented by $L^1$ may be a linear hydrocarbon group, may be a hydrocarbon group having a branch, may be a hydrocarbon group including an aromatic ring, or may be a hydrocarbon group including an alicyclic structure.

Examples of the hydrocarbon group represented by $L^1$ include
a divalent hydrocarbon group being a single species selected from the group P1 consisting of an alkylene group that may include a branched structure and/or an alicyclic structure, an alkenylene group that may include a branched structure and/or an alicyclic structure, and an aryl group; and
a divalent hydrocarbon group in which two or more species selected from the group P1 are bonded together.

The number of the carbon atoms of the hydrocarbon group represented by $L^1$ is preferably 1 to 20, more preferably 3 to 20, still more preferably 4 to 12.

The compound for forming Unit (1) (hereafter, also referred to as "Unit-(1)-forming compound") may be a diisocyanate compound having a structure in which two moieties "—NH(C=O)-*1" in Unit (1) are each replaced by an isocyanate group (—NCO group). Specific examples of the Unit-(1)-forming compound are as follows. However, the Unit-(1)-forming compound is not limited to the following specific examples.

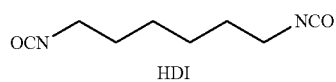

HDI

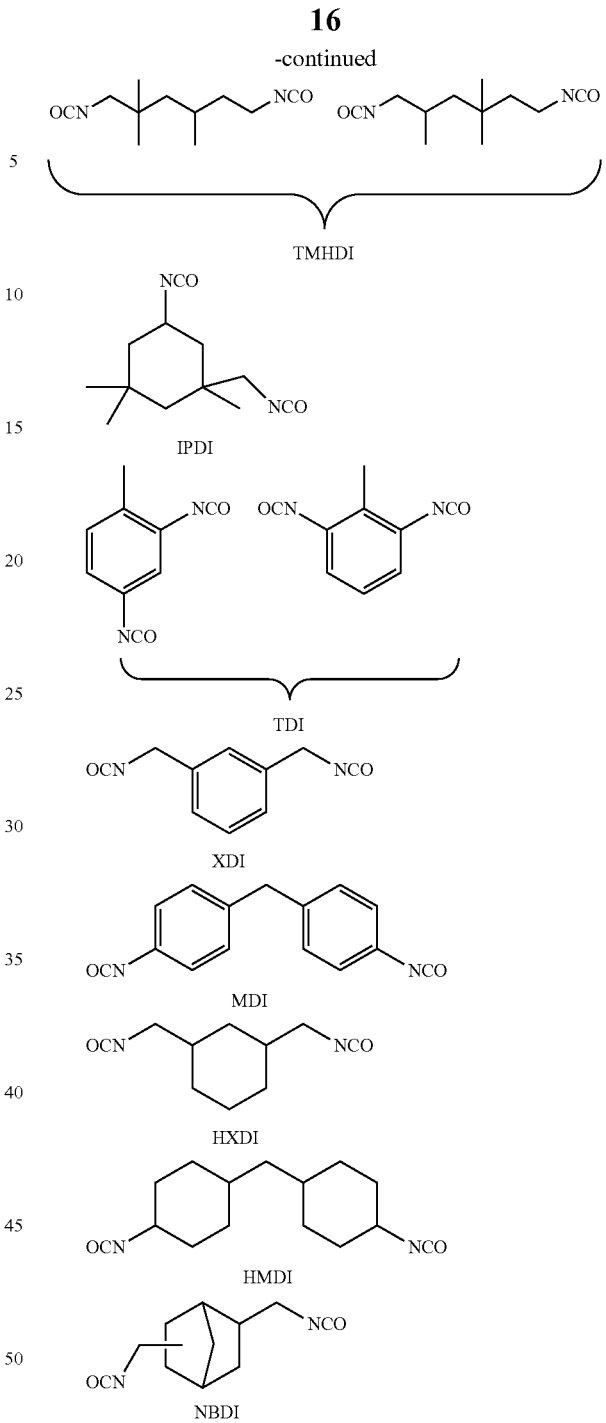

As bifunctional isocyanate compounds, bifunctional isocyanate compounds derived from the above-described specific examples are also usable. Examples of the bifunctional isocyanate compounds include DURANATE (registered trademark) D101, D201, and A101 (manufactured by Asahi Kasei Corporation).

Structural Unit Represented by Formula (2)

When the polymer P includes the structural unit represented by the following Formula (2) (hereafter, also referred to as "Unit (2)"), the polymer P may include a single species of Unit (2) alone, or may include two or more species of Unit (2).

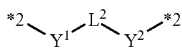 (2)

In Formula (2), $L^2$ represents a hydrocarbon group that has 2 to 50 carbon atoms and that may include an oxygen atom, a nitrogen atom, or a sulfur atom, or a polymer chain that is formed of a polyether chain, a polyester chain, a polycaprolactone chain, a polycarbonate chain, a polybutadiene chain, a polyisoprene chain, or a polyolefin chain and that has a number-average molecular weight of 500 or more, $Y^1$ and $Y^2$ each independently represent —O—, —S—, or —NRz-, Rz represents a hydrogen atom or a hydrocarbon group having 1 to 20 carbon atoms, and two *2's each represent a bonding site.

In the concept of the "hydrocarbon group that has 2 to 50 carbon atoms and that may include an oxygen atom, a nitrogen atom, or a sulfur atom", the hydrocarbon group that has 2 to 50 carbon atoms and that includes an oxygen atom, a nitrogen atom, or a sulfur atom means an organic group having a structure in which, in a hydrocarbon group composed only of carbon atoms and hydrogen atoms, at least one carbon atom is replaced by an oxygen atom, a nitrogen atom, or a sulfur atom, the organic group having 2 to 50 carbon atoms.

As $L^2$, the hydrocarbon group that has 2 to 50 carbon atoms and that may include an oxygen atom, a nitrogen atom, or a sulfur atom (hereafter, also simply referred to as "hydrocarbon group represented by $L^2$") is preferably an alkylene group not substituted or having a substituent.

In the alkylene group having a substituent, examples of the substituent include alkoxy groups, alkylcarbonyloxy groups, alkylthio groups, an amino group, monoalkylamino groups, and di alkyl amino groups.

Unit (2) is Preferably Bonded to at Least Unit (1).

In Formula (2), the number of carbon atoms of the hydrocarbon group represented by $L^2$ is, from the viewpoint of providing a printed textile that is less likely to cause color staining of other textiles and less likely to cause bleeding, preferably 4 to 50, more preferably 6 to 40.

The hydrocarbon group represented by $L^2$ is, from the viewpoint of providing a printed textile that is less likely to cause color staining of other textiles and less likely to cause bleeding, preferably a chain hydrocarbon group that may include an oxygen atom, a nitrogen atom, or a sulfur atom, and that has a branched structure and 4 to 25 carbon atoms, more preferably an unsubstituted branched alkylene group having 6 to 25 carbon atoms, an alkoxylated branched alkylene group having 6 to 25 carbon atoms (specifically, a branched alkylene group substituted with an alkoxy group), or an alkylcarbonyloxylated branched alkylene group having 6 to 25 carbon atoms (specifically, a branched alkylene group substituted with an alkylcarbonyloxy group).

In the alkoxylated branched alkylene group having 6 to 25 carbon atoms, the number of carbon atoms of the alkoxy group is preferably 1 to 23, more preferably 4 to 22.

In the alkylcarbonyloxylated branched alkylene group having 6 to 25 carbon atoms, the number of carbon atoms of the alkylcarbonyloxy group is preferably 2 to 23, more preferably 6 to 22.

The chain hydrocarbon group represented by $L^2$ is, from the viewpoint of providing a printed textile that is less likely to cause color staining of other textiles and less likely to cause bleeding, also preferably an alkylene group substituted with a substituent A and having 2 or more carbon atoms.

The substituent A is preferably at least one species selected from the group consisting of a linear alkyl group having 2 or more carbon atoms, a branched alkyl group having 3 or more carbon atoms, a linear alkoxy group having 2 or more carbon atoms, a branched alkoxy group having 3 or more carbon atoms, a linear alkoxyalkyl group having 2 or more carbon atoms, and a branched alkoxyalkyl group having 3 or more carbon atoms.

The polymer chain represented by $L^2$ has a number-average molecular weight (Mn) of 500 or more.

Mn of the polymer chain represented by $L^2$ is preferably 500 to 50000, more preferably 1000 to 40000, still more preferably 1000 to 30000, still more preferably 1000 to 10000, particularly preferably 1000 to 5000.

The polymer chain represented by $L^2$ is formed of a polyether chain, a polyester chain, a polycaprolactone chain, a polycarbonate chain, a polybutadiene chain, a polyisoprene chain, or a polyolefin chain.

Examples of the polyether chain include a polyethylene glycol chain, a polypropylene glycol chain, and a polybutylene glycol chain. The polyether chain is preferably a polyethylene glycol chain or a polypropylene glycol chain.

The polyester chain may be a residue provided by removing the hydroxy groups at both terminals of Compound (2-17) PEs described later.

The polycaprolactone chain may be a residue provided by removing the hydroxy groups at both terminals of Compound (2-19) PCL described later.

The polycarbonate chain may be a residue provided by removing the hydroxy groups at both terminals of Compound (2-18) PC described later. The polycarbonate chain preferably includes an alkylene group having 2 to 12 (preferably 3 to 8, more preferably 3 to 6) carbon atoms, more preferably a residue provided by removing the hydroxy groups at both terminals of Compound (2-18) PC described later.

$L^2$ is, from the viewpoint of providing a printed textile that is less likely to cause color staining of other textiles and less likely to cause bleeding, preferably a polymer chain formed of a polycarbonate chain or a polyether chain and having a number-average molecular weight of 500 or more.

In Formula (2), $Y^1$ and $Y^2$ each independently represent —O—, —S—, or —NRz-, and Rz represents a hydrogen atom or a hydrocarbon group having 1 to 20 carbon atoms.

Rz is preferably a hydrogen atom or an alkyl group having 1 to 10 carbon atoms, more preferably a hydrogen atom or an alkyl group having 1 to 6 carbon atoms, still more preferably a hydrogen atom, a methyl group, or an ethyl group, still more preferably a hydrogen atom.

$Y^1$ and $Y^2$ are each independently preferably —O— or —S—, more preferably —O—.

The compound for forming Unit (2) (hereafter, also referred to as "Unit-(2)-forming compound") is preferably a compound having a structure in which, in Unit (2), "*2-$Y^1$—" and "—$Y^2$-*2" are each replaced by a hydroxy group, a thiol group, or an amino group (for example, a diol compound, a dithiol compound, or a diamine compound), more preferably a diol compound having a structure in which, in Unit (2), "*2-$Y^1$—" and "—$Y^2$-*2" are each replaced by a hydroxy group.

When the Unit-(2)-forming compound is used for forming Unit (2) in which $L^2$ is a polymer chain and is a diol compound, the Unit-(2)-forming compound is a polymer diol.

More specifically, the polymer diol may be polyetherdiol, polyesterdiol, polycaprolactonediol, polycarbonatediol, polybutadienediol, polyisoprenediol, or polyolefindiol.
Specific examples of the Unit-(2)-forming compound are as follows. However, the Unit-(2)-forming compound is not limited to the following specific examples.
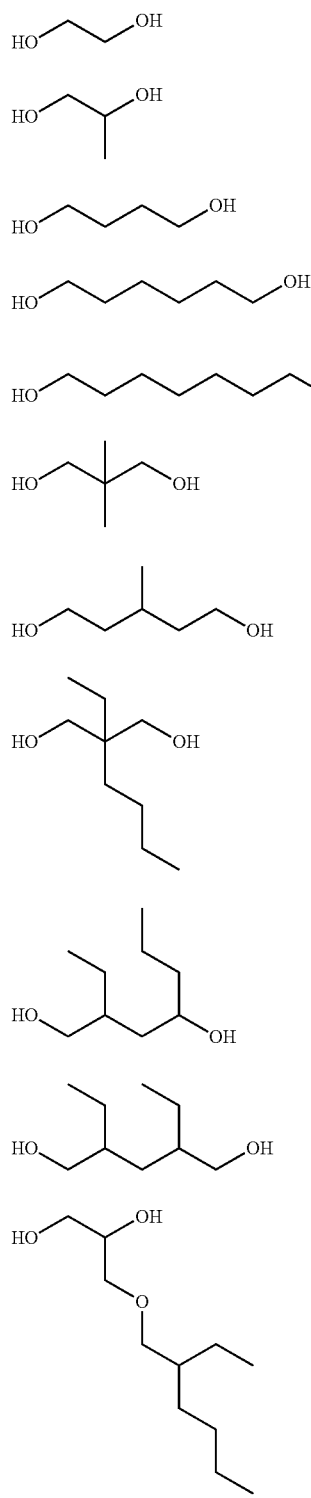
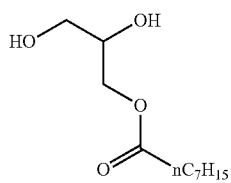
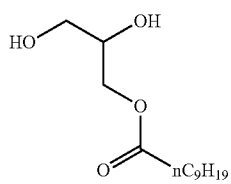
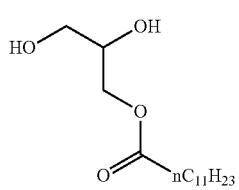
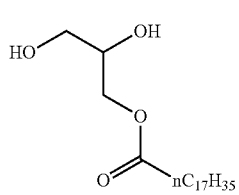
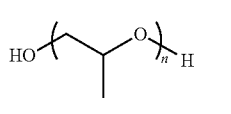
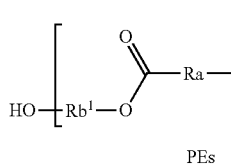
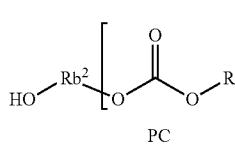
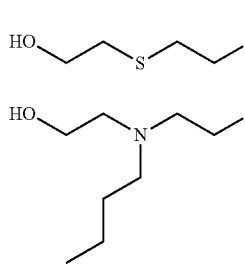

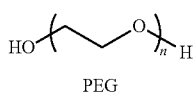
PEG
(2-22)

In Compounds (2-12) to (2-15), $nC_7H_{15}$, $nC_9H_{19}$, $nC_{11}H_{13}$, and $nC_{17}H_{35}$ respectively represent a normal heptyl group, a normal nonyl group, a normal undecyl group, and a normal heptadecyl group.

Compound (2-16) PPG is an example of polyetherdiol, namely, polypropylene glycol; n is the repeat number.

Compound (2-17) PEs is polyester diol; n is the repeat number; Ra, $Rb^1$, and $Rb^2$ each independently represent a divalent hydrocarbon group having 2 to 25 carbon atoms. In Compound (2-17) PEs, n Ra's may be the same or different. In Compound (2-17) PEs, n $Rb^1$'s may be the same or different.

Compound (2-18) PC is polycarbonatediol; n is the repeat number; $Rc^1$ and $Rc^2$ are each independently an alkylene group having 2 to 12 (preferably 3 to 8, more preferably 3 to 6) carbon atoms. In Compound (2-18) PC, n $Rc^1$'s may be the same or different.

Compound (2-19) PCL is polycaprolactonediol; n and m are the repeat numbers; Rd is an alkylene group having 2 to 25 carbon atoms.

Compound (2-22) PEG is an example of polyetherdiol, namely, polyethylene glycol; n is the repeat number.

Examples of the Unit-(2)-forming compound include, in addition to the above-described compounds, the following compounds.

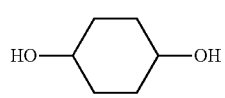
(2-a)

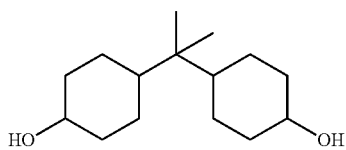
(2-b)

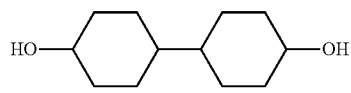
(2-c)

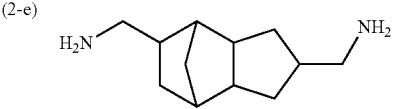
(2-d)

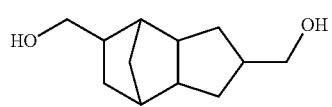
(2-e)

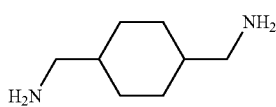
(2-f)

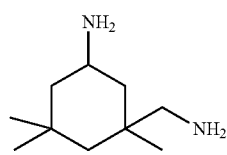
(2-g)

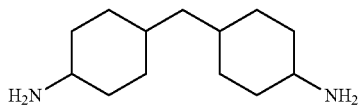
(2-h)

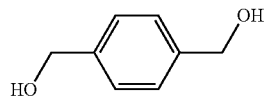
(2-i)

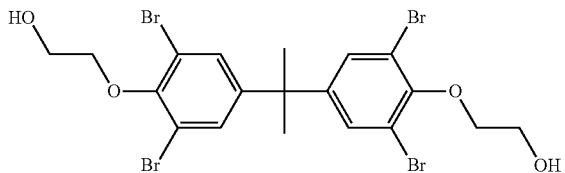
(2-j)

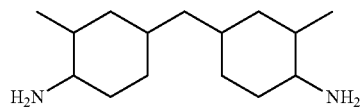
(2-k)

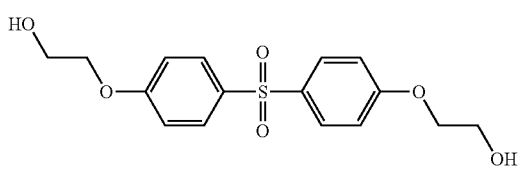
(2-L)

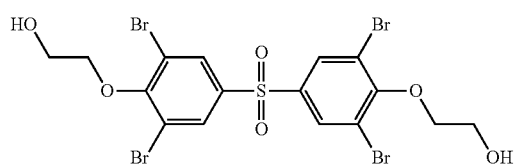
(2-m)

(2-n)

-continued
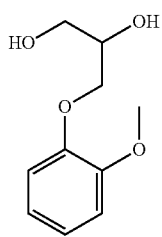 (2-o)
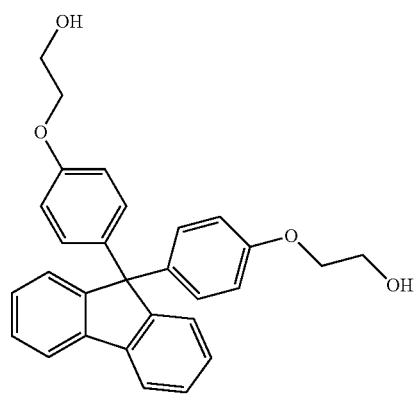 (2-p)
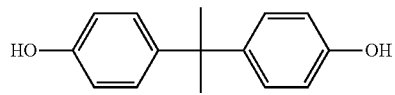 (2-q)
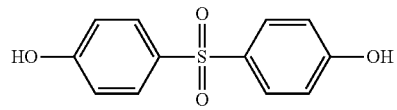 (2-r)
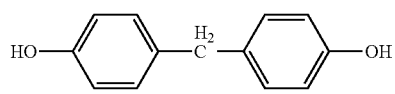 (2-s)
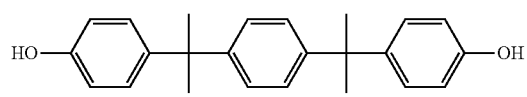 (2-t)
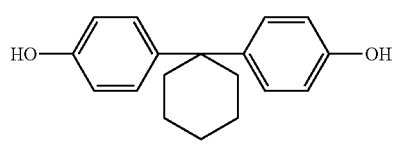 (2-u)
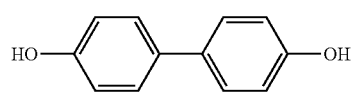 (2-v)
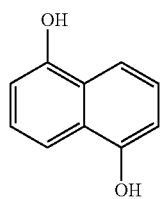 (2-w)
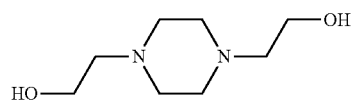 (2-x)
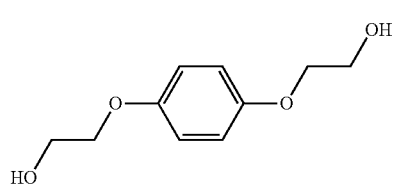 (2-y)
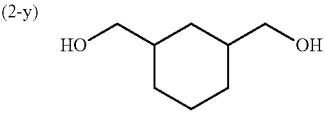 (2-z)
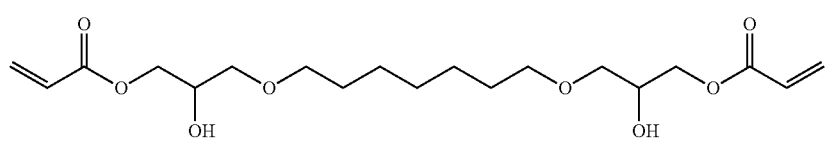 (2-101)
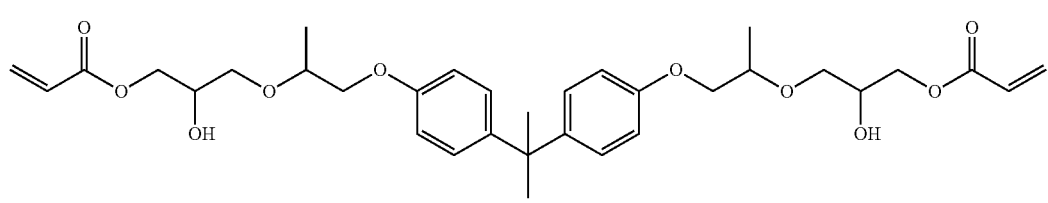 (2-102)
DA-250

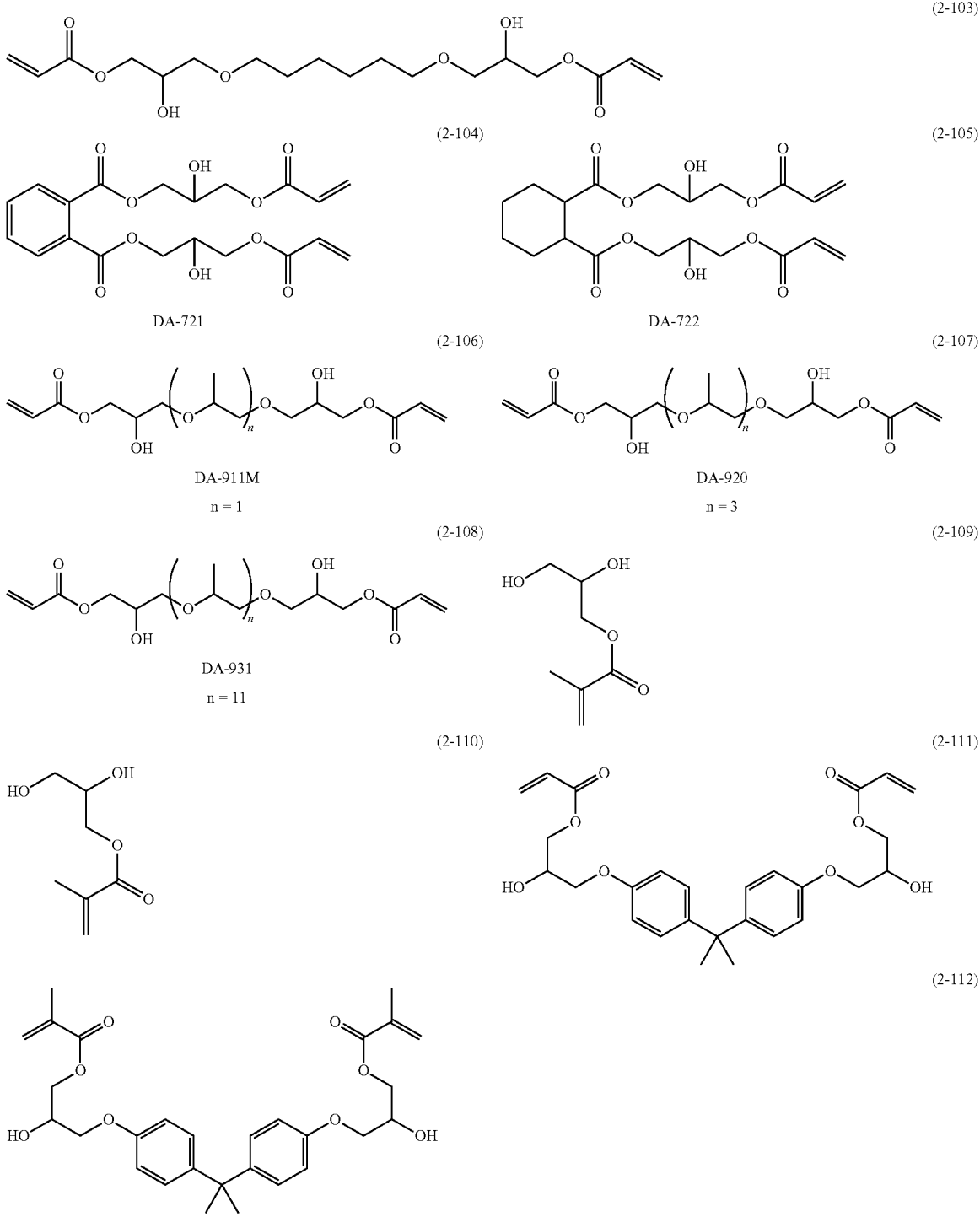

Examples of the Unit-(2)-forming compound include, in addition to the above-described compounds, polybutadienediol (hereafter, also referred to as "PBD"), polyisoprenediol (hereafter, also referred to as "PIP"), and polyolefindiol.

As such polymer diols serving as the Unit-(2)-forming compounds, commercially available products may also be used. Examples of the commercially available products include polycarbonatediol (product name: "DURANOL (registered trademark) T5651", manufactured by Asahi Kasei Chemicals Corporation). For the commercially available products of the polymer diols, reference may also be made to Paragraph 0111 in WO2016/152254A.

From the viewpoint of providing a printed textile that is less likely to cause color staining of other textiles and less likely to cause bleeding, the total content of Unit (1) and Unit (2) in the polymer P relative to the total amount of the polymer P is preferably 50 mass % or more, more preferably 60 mass % or more, still more preferably 80 mass % or more.

In the polymer P, the molar ratio of Unit (2) to Unit (1) (thus, Unit (2)/Unit (1)) is preferably 0.20 or more and less than 1.00, more preferably 0.30 or more and 0.90 or less, still more preferably 0.50 or more and 0.90 or less.

Structural Unit Having Hydrophilic Group

The polymer P preferably includes at least one species of a structural unit having a hydrophilic group.

Specific examples and preferred forms of the hydrophilic group are the same as those described above.

The structural unit having a hydrophilic group is preferably formed from, as a raw material, a hydrophilic-group-introducing compound described later.

The structural unit having a hydrophilic group is preferably a structural unit represented by the following Formula (3) (hereafter, also referred to as "Unit (3)").

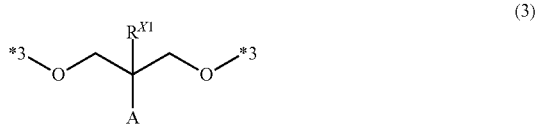

(3)

In Formula (3), $R^{X1}$ represents a hydrogen atom or an alkyl group having 1 to 10 carbon atoms; A represents an anionic group; and two *3's each represent a bonding site.

Unit (3) is Preferably Bonded to at Least Unit (1).

Examples of the anionic group represented by A are the same as the above-described examples of the anionic group.

The anionic group represented by A is preferably a carboxy group or a salt of a carboxy group. The polymer P may include a form of Unit (3) in which A is a carboxy group and a form of Unit (3) in which A is a salt of a carboxy group.

Relative to the total amount of the polymer P, the content of the structural unit having a hydrophilic group (for example, Unit (3)) is preferably 3 mass % to 30 mass %, more preferably 5 mass % to 20 mass %.

Relative to the total amount of the polymer P, the content of the structural unit having an anionic group may be adjusted in consideration of the acid value (mmol/g) of the polymer P.

Hydrophilic-Group-Introducing Compound

A structural unit having a hydrophilic group can be introduced into the polymer P by using a hydrophilic-group-introducing compound.

Of such hydrophilic-group-introducing compounds, examples of an anionic-group-introducing compound include, a compound in which, in Unit (3), hydrogen atoms are individually bonded to two *3's; and amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine).

Examples of the compound in which, in Unit (3), hydrogen atoms are individually bonded to two *3's include 2,2-dimethylolpropionic acid (DMPA) and 2,2-dimethylolbutanoic acid (DMBA).

The anionic-group-introducing compound may be treated with an inorganic base such as sodium hydroxide or potassium hydroxide or an organic base such as triethylamine such that the anionic groups are at least partially neutralized, and used.

The anionic groups may be neutralized during the forming process of the polymer P (for example, the forming process of coloring resin particles described later).

Of the hydrophilic-group-introducing compounds, a nonionic-group-introducing compound is preferably a compound having a polyether structure, more preferably a compound having a polyoxyalkylene group.

The polymer P may include, in addition to the above-described structural units, another structural unit. However, when the polymer P includes the structural unit having a hydrophilic group, from the viewpoint of the dispersion stability of the water-insoluble dye, the total content of Unit (1), Unit (2), and the structural unit having a hydrophilic group relative to the total amount of the polymer P is preferably 80 mass % or more.

Preferred Form of Polymer P

The polymer P preferably includes the structure of a reaction product of the Unit-(1)-forming compound (preferably, a diisocyanate compound having a structure in which, in Unit (1), two moieties "—NH(C=O)-*1" are each replaced by an isocyanate group (—NCO group)), the Unit-(2)-forming compound (preferably, a compound having a structure in which, in Unit (2), "*2-$Y^1$—" and "—$Y^2$-*2" are each replaced by a hydroxy group, a thiol group, or an amino group), and the hydrophilic-group-introducing compound (preferably, a compound in which, in Unit (3), hydrogen atoms are individually bonded to two *3's).

The polymer P preferably includes a urethane bond. Examples of the urethane bond include a urethane bond formed by bonding together Unit (1) and a form of Unit (2) in which $Y^1$ and $Y^2$ are each —O—, and a urethane bond formed by bonding together Unit (1) and Unit (3).

The structure of a terminal of the main chain of the polymer P is not particularly limited; a terminal group of the main chain of the polymer P is preferably an alkyl group having 1 to 20 (more preferably 1 to 10, still more preferably 1 to 6) carbon atoms.

The terminal alkyl group having 1 to 20 (more preferably 1 to 10, still more preferably 1 to 6) carbon atoms can be formed by, for example, using, as a terminal capping agent, an alcohol having 1 to 20 (more preferably 1 to 10, still more preferably 1 to 6) carbon atoms, a thioalcohol having 1 to 20 (more preferably 1 to 10, still more preferably 1 to 6) carbon atoms, or a monoalkylamine having 1 to 20 (more preferably 1 to 10, still more preferably 1 to 6) carbon atoms.

The polymer P is, from the viewpoint of providing a printed textile that is less likely to cause color staining of other textiles and less likely to cause bleeding, preferably a chain polymer. The term "chain polymer" means a polymer not including a cross-linked structure.

The chain polymer may include a ring structure. The chain polymer may include a branched structure.

The ratio of the content of the polymer P to the content of the water-insoluble dye (in other words, polymer P content/water-insoluble dye content) is, from the viewpoint of further improving the optical density of the printed textile, on the mass basis, preferably 0.10 to 4.00, more preferably 0.10 to 2.50, still more preferably 0.20 to 2.50, particularly preferably 0.20 to 1.50, still more preferably 0.25 to 1.00.

A preferred example of the method for synthesizing the polymer P is an example of causing a reaction of, in the presence of an oil organic solvent described later, the Unit-(1)-forming compound, the Unit-(2)-forming compound, and the hydrophilic-group-introducing compound.

This example of the synthesis method may be performed to synthesize a polymer having a form in which anionic groups serving as hydrophilic groups are not neutralized;

this polymer may be used as one of the raw materials to prepare a coloring resin particle dispersion liquid described later; in the preparation stage, anionic groups of the polymer may be neutralized, to form the polymer P.

Coloring Resin Particle Dispersion Liquid

The ink composition can be produced by, for example, mixing together a water-insoluble dye, a dispersing agent, water, and the like to perform dispersion treatment. The dispersion liquid produced by mixing together a water-insoluble dye, a dispersing agent, water, and the like to perform dispersion treatment is referred to as "coloring resin particle dispersion liquid". The ink composition may be produced by adding, to the coloring resin particle dispersion liquid, another component.

The coloring resin particle dispersion liquid may include, in addition to the water-insoluble dye, the dispersing agent, and water, another component.

From the viewpoint of providing a printed textile that is less likely to cause color staining of other textiles and less likely to cause bleeding, in the coloring resin particle dispersion liquid, the total content of water and the coloring resin particles relative to the total amount of the coloring resin particle dispersion liquid is preferably 80 mass % or more.

Example of Method for Producing Coloring Resin Particle Dispersion Liquid

The production method for producing the coloring resin particle dispersion liquid is not particularly limited.

Hereinafter, an example of the method for producing the coloring resin particle dispersion liquid (hereafter, also referred to as "production method A") will be described.

The production method A includes a step of preparing an oil-phase component including an oil organic solvent, the polymer P or the polymer P in which anionic groups serving as hydrophilic groups are to be neutralized, and an oil-soluble dye, a step of preparing an aqueous-phase component including water (and a neutralizer as needed), and an emulsification step of mixing together the oil-phase component and the aqueous-phase component, and emulsifying the resultant mixture to obtain an emulsion.

In the production method A, the emulsification step is performed to form the coloring resin particles and to disperse the formed coloring resin particles in water; this provides a coloring resin particle dispersion liquid in which coloring resin particles are dispersed in water.

The term "coloring resin particles" means particulates in which the surfaces of the water-insoluble dye are covered with the dispersing agent. Note that the dispersing agent may cover the whole surfaces of the water-insoluble dye, or may cover only portions of the surfaces of the water-insoluble dye.

The term "oil organic solvent" means an organic solvent that has a solubility of 10 mass % or less in water at 20° C. The solubility of the oil organic solvent in water at 20° C. is preferably 5 mass % or less, more preferably 1 mass % or less. When the solubility of the oil organic solvent in water at 20° C. is 5 mass % or less, the oil (organic component) and water become less miscible during emulsification, to further improve the synthesis suitability and the stability of the coloring resin particles. The production method A may employ a single oil organic solvent alone or two or more oil organic solvents.

The oil organic solvent may be an oil organic solvent having volatility or an oil organic solvent having nonvolatility. Of these, the oil organic solvent having nonvolatility has a higher probability of being present in the coloring resin particles. The term "oil organic solvent having volatility" means an oil organic solvent that has a boiling point of less than 100° C. Examples of the oil organic solvent having volatility include ester-based solvents such as ethyl acetate and ketone-based solvents such as methyl ethyl ketone.

The term "organic solvent having nonvolatility" means an oil organic solvent that has a boiling point of more than 100° C. The oil organic solvent having nonvolatility is, from the viewpoint of exhibiting nonvolatility during the reaction and from the viewpoint of the preservation stability of the ink composition, preferably an oil organic solvent having a boiling point of 180° C. or more. Note that, in the present disclosure, the boiling point is the value of a boiling point under standard conditions (1 atm, 25° C.). 1 atm is 101.325 kPa.

Specific examples of the oil organic solvent having nonvolatility include non-halogen phosphoric acid esters (for example, TCP manufactured by DAIHACHI CHEMICAL INDUSTRY CO., LTD.), alkyl group-substituted aromatic compounds (for example, alkene KS-41 manufactured by JXTG Energy Corporation, and KMC500 manufactured by Kureha Chemical Industry Co., Ltd.), long-chain alkyl group-substituted ester compounds (for example, methyl laurate KS-33 manufactured by NOF CORPORATION, and glycerol tris(2-ethylhexanoate) manufactured by FUJIFILM Wako Pure Chemical Corporation), dibasic acid esters (for example, DBE manufactured by INVISTA, dimethyl succinate, dimethyl glutarate, and diisopropyl succinate manufactured by Tokyo Chemical Industry Co., Ltd.), and alkylene glycol derivatives (for example, manufactured by Tokyo Chemical Industry Co., Ltd., ethylene glycol monobutyl ether acetate, diethylene glycol monobutyl ether acetate, diethylene glycol dibutyl ether, and diethylene glycol dibenzoate).

Of these, the oil organic solvent having nonvolatility is preferably DBE, dimethyl succinate, dimethyl glutarate, diisopropyl succinate, glycerol tris(2-ethylhexanoate), diethylene glycol monobutyl ether acetate, or diethylene glycol dibutyl ether.

In the case of using, as the oil-phase component, an oil-phase component including the polymer P in which anionic groups serving as hydrophilic groups are to be neutralized and using, as the aqueous-phase component, an aqueous-phase component including water and a neutralizer, in the emulsification step, in the polymer P in which anionic groups are to be neutralized, anionic groups are at least partially neutralized, to thereby form coloring resin particles containing the polymer P including neutralized anionic groups (for example, —COONa).

As the neutralizer, a basic compound such as sodium hydroxide, potassium hydroxide, or triethylamine is usable.

In the emulsification step, the process of performing emulsification is not particularly limited, but may be, for example, emulsification using an emulsification apparatus such as a homogenizer (for example, a dispersing machine).

In the emulsification, the number of revolutions of the dispersing machine is, for example, 5000 rpm to 20000 rpm, preferably 10000 rpm to 15000 rpm. This term "rpm" is the abbreviation of revolutions per minute.

In the emulsification, the time for revolutions is, for example, 1 minute to 120 minutes, preferably 3 minutes to 60 minutes, more preferably 3 minutes to 30 minutes, still more preferably 5 minutes to 15 minutes.

In the emulsification step, emulsification may be performed under heating. Such emulsification under heating enables more efficient formation of the coloring resin particles. In addition, the emulsification under heating facilitates removal of at least partially the oil organic solvent in the oil-phase component from the mixture.

In the case of performing emulsification under heating, the heating temperature is preferably 35° C. to 70° C., more preferably 40° C. to 60° C.

The production method A may include a heating step of heating the emulsion or a mixture of the emulsion and water to remove at least partially the oil organic solvent.

In the heating step, the heating temperature is preferably 35° C. to 70° C., more preferably 40° C. to 60° C.

Water

The ink composition includes water. The water content in the ink composition relative to the total amount of the ink composition is preferably 40 mass % or more, more preferably 50 mass % or more, still more preferably 60 mass % or more. The upper limit value of the water content, though it depends on the solid content of the ink composition, is, relative to the total amount of the ink composition, for example, 90 mass %.

Solvent

The ink composition preferably includes a solvent. The ink composition may include a single solvent or two or more solvents.

Preferred examples of the solvent that can be contained in the ink composition are the same as the preferred examples of the solvent that can be contained in the pretreatment liquid.

In the ink composition, the solvent content relative to the total amount of the ink composition is preferably 5 mass % to 60 mass %, more preferably 10 mass % to 50 mass %, still more preferably 15 mass % to 40 mass %. When the solvent content is within such a range, the ink composition has high preservation stability and also, in the case of being ejected by an ink jet recording process, exhibits high ejection performance.

Cross-Linking Agent

The ink composition may further include a cross-linking agent. The cross-linking agent is preferably a compound that has at least two cross-linking groups. The cross-linking agent has a cross-linking group that is preferably a carboxy group, a hydroxyl group, a sulfonic group, or an amide group.

Examples of the cross-linking agent include blocked isocyanate-based compounds, oxazoline-based compounds, and carbodiimide compounds. In particular, preferred cross-linking agents are blocked isocyanate-based compounds provided by blocking, using a blocking agent, TMP (trimethylolpropane) adducts or isocyanurates of diisocyanates (for example, HDI (hexamethylene diisocyanate), H6XDI (hydrogenated xylylene diisocyanate), IPDI (isophorone diisocyanate), and H12MDI (dicyclohexylmethane diisocyanate)); and carbodiimide compounds.

For the blocked isocyanate-based compounds, the blocking agent is, from the viewpoint of unblocking temperature, preferably DEM (diethyl malonate), DIPA (diisopropylamine), TRIA (1,2,4-triazole), DMP (3,5-dimethylpyrazole), or MEKO (butanone oxime).

Such a blocked isocyanate-based compound can also be used as an oligomer provided by causing partially the isocyanate groups to react with polyol, polycarbonate, polyester, or polyether, for example.

As the carbodiimide compounds, examples include CARBODILITE cross-linking agents for aqueous resins, E-02, E-03A, and E-05 (all are product names) manufactured by Nisshinbo Chemical Inc.; and, from the viewpoint of preservation stability and reactivity, preferred is E-05.

As the unblocking temperature of the cross-linking agent, from the viewpoint of cross-linking efficiency, the lower the unblocking temperature, the more preferable it is; from the viewpoint of preservation stability, the higher the unblocking temperature, the more preferable it is. From the viewpoint of the balance between cross-linking efficiency and preservation stability, the unblocking temperature is preferably 90° C. to 180° C., more preferably 90° C. to 120° C., particularly preferably 110° C. to 120° C.

The cross-linking agent is preferably contained, as a cross-linking agent having a hydrophilic group and having water-solubility or self-emulsifiability, in the ink composition. The cross-linking agent having water-solubility or self-emulsifiability is made to be contained in the ink composition, to thereby lower the viscosity of the ink composition, to improve the re-dispersibility.

The cross-linking agent may be cross-linking agent particles. The cross-linking agent particles preferably have an average particle size of, in the case of ejecting the ink composition by an ink jet recording process, from the viewpoint of the ejection performance, 200 nm or less.

The average particle size can be the value of a volume-average particle size (MV) measured using a particle size distribution analyzer (product name "Nanotrac UPA EX150", manufactured by NIKKISO CO., LTD.).

The cross-linking agent particles are not particularly limited, and examples include ELASTRON BN-77 (blocked isocyanate, particle size: 19 nm, unblocking temperature: 120° C. or more, manufactured by DAI-ICHI KOGYO SEIYAKU CO., LTD.), ELASTRON BN-27 (blocked isocyanate, particle size: 108 nm, unblocking temperature: 180° C. or more, manufactured by DAI-ICHI KOGYO SEIYAKU CO., LTD.), Duranate WM44-70G (blocked isocyanate, particle size: 42 nm, unblocking temperature: about 90° C., manufactured by Asahi Kasei Corporation), and TRIXENE AQUA BI200 (blocked isocyanate, particle size: 94 nm, unblocking temperature: 110-120° C., manufactured by BAXENDEN Chemicals Ltd.).

When the ink composition contains a cross-linking agent, in the ink composition, the cross-linking agent content relative to the total amount of the ink composition is preferably 0.1 mass % to 10 mass %, more preferably 0.5 mass % to 8 mass %, still more preferably 1 mass % to 5 mass %.

Pigment

The ink composition may further include, from the viewpoint of adjusting the hue or improving the color density, a pigment.

Examples of the pigment include carbon black, aniline black;

C.I. Pigment Yellow 3, 12, 53, 55, 74, 81, 83, 93, 94, 95, 97, 98, 100, 101, 104, 108, 109, 110, 117, 120, 128, 138, 153, 155, 180, 185;

C.I. Pigment Red 112, 114, 122, 123, 146, 149, 166, 168, 170, 172, 177, 178, 179, 185, 190, 193, 202, 206, 209, 219;

C.I. Pigment Violet 19, 23;

C.I. Pigment Orange 36, 43, 64;

C.I. Pigment Blue 15, 15:1, 15:2, 15:3, 15:4, 15:6, 16, 17:1, 56, 60, 63; and

C.I. Pigment Green 36.

When the ink composition includes the pigment, in the ink composition, the pigment content relative to the total amount of the ink composition is preferably 0.5 mass % to 10 mass %, more preferably 0.5 mass % to 8 mass %, still more preferably 0.5 mass % to 5 mass %.

In the preparation of the ink composition, an aqueous dispersion liquid of the pigment prepared by using a dispersing agent to disperse the pigment in water (also referred to as "aqueous pigment dispersion liquid") is also usable. As the aqueous pigment dispersion liquid, for example, a pigment dispersion described in JP2012-7148A is usable. As the aqueous pigment dispersion liquid, commercially available products such as Pro-jet Black APD1000 (manufactured by Fujifilm Imaging Colorants Inc.) are also usable.

The pigment may be a self-dispersible pigment. The self-dispersible pigment is a pigment that is dispersible in water without using a dispersing agent. The self-dispersible pigment is, for example, a pigment in which, to its surfaces, at least one species selected from the group consisting of hydrophilic groups such as a carbonyl group, a hydroxyl group, a carboxyl group, a sulfo group, and a phosphoric acid group and salts of the foregoing is introduced directly or using a chemical bond to another group on the surfaces.

The self-dispersible pigment is preferably self-dispersible carbon black. Examples of the self-dispersible pigment include commercially available products such as self-dispersible carbon black CAB-O-JET 200, CAB-O-JET 300, and CAB-O-JET 400 (all are manufactured by Cabot Corporation), BONJET CW-1 (carboxy group: 500 µmol/g), BONJET CW-2 (carboxy group: 470 µmol/g) (all are manufactured by ORIENT CHEMICAL INDUSTRIES CO., LTD.), and Aqua-Black 162 (carboxyl group: about 800 µmol/g) from TOKAI CARBON CO., LTD.

Wax

The ink composition may include wax. The wax is preferably present in the form of particles in the ink composition. Hereafter, the wax present in the form of particles will be referred to as "wax particles".

As the wax particles, a dispersion liquid in which the wax is dispersed in water is preferably used.

The wax is preferably polyethylene wax, paraffin wax, or carnauba wax.

The melting point of the wax is, from the viewpoint of improving the stability and the frictional properties, preferably in the range of 60° C. to 120° C., more preferably in the range of 60° C. to 100° C. Such a wax having a melting point of 60° C. or more can improve the stability of the ink composition. On the other hand, such a wax having a melting point of 120° C. or less is effective for improving the frictional properties. The melting point of the wax can be measured using an ordinary melting point measurement apparatus.

The volume-average particle size of the wax particles is, in the case of ejecting the ink composition by an ink jet recording process, from the viewpoint of the ejection performance, preferably 0.3 µm or less, more preferably 0.2 µm or less, still more preferably 0.1 µm or less. The volume-average particle size of the wax particles can be measured by the same method as in the volume-average particle size of the coloring resin particles.

When the ink composition includes wax, the wax content relative to the total amount of the ink composition is preferably 0.1 mass % to 10 mass %, more preferably 0.5 mass % to 8 mass %, still more preferably 1 mass % to 5 mass %.

The wax particles may be commercially available products. Examples of the commercially available products include Polyron L-787 (manufactured by Chukyo Yushi Co., Ltd., polyethylene wax, nonionic, melting point: 102° C., volume-average particle size: 0.1 µm), Hidorin-703 (manufactured by Chukyo Yushi Co., Ltd., paraffin wax, anionic, melting point: 75° C., volume-average particle size: 0.1 µm), R108 (manufactured by Chukyo Yushi Co., Ltd., paraffin wax, nonionic, melting point: 66° C., volume-average particle size: 0.2 µm), and Selosol 524 (manufactured by Chukyo Yushi Co., Ltd., carnauba wax, nonionic, melting point: 83° C., volume-average particle size: 0.07 µm).

Surfactant

The ink composition may include at least one surfactant.

The surfactant is not particularly limited, and publicly known surfactants such as silicone-based surfactants, fluorosurfactants, and acetylene glycol-based surfactants are usable.

When the ink composition includes a surfactant, the surfactant content relative to the total amount of the ink composition is preferably 0.05 mass % to 2.0 mass %, more preferably 0.1 mass % to 2.0 mass %.

Other Component

The ink composition may include, in addition to the above-described components, another component.

Examples of the other component include a pH adjusting agent, a fluorescent brightening agent, a surface tension modifier, an anti-foaming agent, an anti-drying agent, a lubricant, a thickener, an ultraviolet absorbent, an anti-fading agent, an antistatic agent, a matting agent, an antioxidant, a resistivity control agent, an anticorrosive, a reduction inhibitor, a preservative, a fungicide, and a chelating agent.

For the other component, reference may be made to descriptions in WO2017/131107A.

Properties of Ink Composition

The ink composition preferably has a surface tension of 20 mN/m to 70 mN/m, more preferably 25 mN/m to 60 mN/m. The term "surface tension" means a value measured at 25° C.

The surface tension can be measured by using a surface tensiometer such as a product name "Automatic Surface Tentiometer CBVP-Z (manufactured by Kyowa Interface Science Co., Ltd.)".

The ink composition preferably has a viscosity of 40 mPa·s or less, more preferably 30 mPa·s or less. The term "viscosity" is a value measured at 25° C.

The viscosity can be measured by using a viscometer such as a product name "VISCOMETER TV-22 viscometer (manufactured by Toki Sangyo Co., Ltd.)".

Textile Printing Method

The textile printing method according to the present disclosure preferably includes a pretreatment liquid application step of applying the pretreatment liquid included in the ink set, to a textile, and an ink application step of applying the ink composition included in the ink set, to the textile to which the pretreatment liquid has been applied.

The textile printing method according to the present disclosure employs the ink set according to the present disclosure, to thereby provide a printed textile that is less likely to cause color staining of other textiles and less likely to cause bleeding.

Pretreatment Liquid Application Step

In the textile printing method according to the present disclosure, first, the pretreatment liquid included in the ink set is applied to a textile.

Textile

Examples of the type of fiber in the textile include synthetic fibers such as nylon, polyester, and acrylonitrile; semi-synthetic fibers such as acetate and rayon; natural fibers such as cotton, silk, and fur; and mixed fibers composed of two or more selected from the group consisting of synthetic fibers, semi-synthetic fibers, and natural fibers.

The type of fiber in the textile is preferably cellulose fiber, more preferably cotton. Examples of the form of the textile include woven fabrics, knitted fabrics, and nonwoven fabrics. The textile may be a textile for a textile product.

Examples of the textile product include clothing items (for example, T-shirts, sweatshirts, jerseys, pants, sweat suits, one-piece dresses, and blouses), bedclothes, and handkerchiefs.

Application of Pretreatment Liquid

The process of applying the pretreatment liquid to the textile is not particularly limited, and examples include a coating process, a padding process, an ink jet process, a spraying process, and a screen printing process. Of these, from the viewpoint of making the resultant printed textile be less likely to cause bleeding, the process of applying the pretreatment liquid to the textile is preferably an ink jet process. Thus, the ink jet recording process is preferably used to apply the pretreatment liquid.

As the ink jet recording process, ordinary and publicly known processes are usable; examples include a charge control process of using the electrostatic attractive force to eject the pretreatment liquid, a drop-on-demand process (pressure pulse process) of using the vibration pressure of piezoelectric elements, an acoustic ink jet process of transforming electric signals into acoustic beams and radiating them to the pretreatment liquid to use the radiation pressure to eject the pretreatment liquid, and a thermal ink jet process of heating the pretreatment liquid to form bubbles and using the resultant pressure.

In general, as the image recording systems in ink jet recording apparatuses, there are a shuttle scan system (also referred to as "serial head system") of using a short serial head to perform image recording, and a single pass system (also referred to as "line head system") of using a line head in which recording elements are arranged so as to correspond to the whole region of the recording medium in the width direction to perform image recording. In the shuttle scan system, the serial head is scanned in the width direction of the recording medium to perform image recording. By contrast, in the single pass system, the recording medium is scanned in a direction orthogonal to the arrangement direction of the recording elements to thereby perform image recording over the whole surface of the recording medium. Thus, in the single pass system, unlike the shuttle scan system, the transport mechanism such as a carriage for scanning the serial head is not necessary. In addition, in the single pass system, movement of the carriage and the complicated scanning control of the carriage relative to the recording medium are not necessary, and only the recording medium is moved, to thereby achieve an increase in the recording speed, compared with the shuttle scan system.

In the pretreatment liquid application step, the pretreatment liquid is preferably applied by the single pass system.

The ink jet head ejects the pretreatment liquid in a drop volume of preferably 1 pL (picoliter) to 150 pL, more preferably 2 pL to 120 pL, particularly preferably 20 pL to 60 pL. Note that the term "drop volume" means the volume of the ink ejected once from a single nozzle by an ink jet recording process.

The amount of the pretreatment liquid applied is, from the viewpoint of suppressing bleeding, preferably 10 g/m$^2$ to 30 g/m$^2$, more preferably 15 g/m$^2$ to 25 g/m$^2$.

The pretreatment liquid is ejected at a resolution of, preferably 200 dpi (dot per inch) or more×200 dpi or more, more preferably 400 dpi or more×400 dpi or more and 1200 dpi or less×1200 dpi or less. Note that "dpi" means the number of dots per 25.4 mm.

In the pretreatment liquid application step, the pretreatment liquid is preferably applied using an ink jet recording apparatus having a liquid circulation mechanism for circulating the pretreatment liquid between the liquid tank and the ink jet head. The ink jet recording apparatus having the liquid circulation mechanism is specifically an apparatus configured to supply, from the liquid tank storing the pretreatment liquid, the pretreatment liquid to the ink jet head, and to collect the pretreatment liquid from the ink jet head to the liquid tank, to thereby circulate the pretreatment liquid between the liquid tank and the ink jet head for ejecting the pretreatment liquid. When the pretreatment liquid remains in the near-nozzle region, the pretreatment liquid dries, which tends to cause clogging of the nozzles, which tends to lead to ejection failure. In the case where the pretreatment liquid is ejected only in an amount smaller than the predetermined ejection amount, that is, ejection failure occurs, the pretreatment liquid's effect of aggregating the ink composition may not be sufficiently exerted. On the other hand, in the case where the pretreatment liquid is ejected at high performance, the pretreatment liquid's effect of aggregating the ink composition is sufficiently exerted, to make the resultant printed textile be less likely to cause color staining of other textiles. In the case of using the ink jet recording apparatus having the liquid circulation mechanism, the pretreatment liquid in the near-nozzle region is continuously renewed, and the pretreatment liquid can be ejected with stability, so that the resultant printed textile is even less likely to cause color staining of other textiles.

Ink Application Step

In the textile printing method according to the present disclosure, after the pretreatment liquid application step, the ink composition included in the ink set is applied to the textile to which the pretreatment liquid has been applied.

Application of Ink Composition

The process of applying the ink composition to the textile to which the pretreatment liquid has been applied is not particularly limited and examples include a coating process, a padding process, an ink jet process, a spraying process, and a screen printing process. Of these, the process of applying the ink composition is, from the viewpoint of making the resultant printed textile be less likely to cause bleeding, preferably an ink jet process. Thus, the ink jet recording process is preferably used to apply the ink composition. The ink jet recording process is the same as that described in the "Pretreatment liquid application step" section.

In the ink application step, the ink composition is preferably applied by the single pass system.

The ink jet head ejects the ink composition in a drop volume of preferably 1 pL (picoliter) to 150 pL, more preferably 2 pL to 120 pL, particularly preferably 20 pL to 60 pL. Note that the term "drop volume" means the volume of ink ejected once from a single nozzle by an ink jet recording process.

The amount of the ink composition applied is, from the viewpoint of suppressing bleeding, preferably 10 g/m$^2$ to 30 g/m$^2$, more preferably 15 g/m$^2$ to 25 g/m$^2$.

The ink composition is ejected preferably at a resolution of 200 dpi or more×200 dpi or more, more preferably 400 dpi or more×400 dpi or more and 1200 dpi or less×1200 dpi or less.

In the ink application step, the ink composition is preferably applied using an ink jet recording apparatus having a liquid circulation mechanism for circulating the ink composition between the liquid tank and the ink jet head.

Heat Treatment Step

The textile printing method according to the present disclosure may have a heat treatment step of, after the ink application step, heat-treating the textile to which the ink composition has been applied. Examples of the heat treatment device include a heating drum, hot air, an infrared lamp, a heating oven, a heating plate, a heat press, and a hot plate. The heat treatment temperature is preferably 200° C. or less, more preferably 100° C. to 180° C., still more preferably 120° C. to 170° C. The heat treatment time is preferably 5 seconds to 200 seconds, more preferably 30 seconds to 160 seconds.

The textile printing method according to the present disclosure may include, in addition to the above-described steps, another step. Examples of the other step include a posttreatment step of posttreating, using a posttreatment agent, the colored textile having been subjected to the heat treatment step.

The ink set according to an embodiment of the present disclosure has a pretreatment liquid including a cationic compound having a molecular weight per cationic valence of 150 to 220, and an ink composition including a water-insoluble dye, a dispersing agent, and water, wherein the dispersing agent is at least one selected from the group consisting of a urethane resin, a urea resin, and a urethane-urea resin, to thereby provide strongly the effect of fixing the water-insoluble dye on a textile. Therefore, in the textile printing method according to the present disclosure, the washing treatment ordinarily performed after the heat treatment step is not necessary.

EXAMPLES

Hereinafter, the present disclosure will be described more specifically with reference to Examples; however, the present disclosure, within the spirit and scope thereof, is not limited to the following Examples.

Example 1

Preparation of Pretreatment Liquid

The following components were mixed together and stirred for 60 minutes, to thereby prepare a pretreatment liquid having a cationic compound content of 10 mass %.

- Cationic compound: dicyandiamide-diethylenetriamine condensation product (product name: "PAPYOGEN P-300", manufactured by SENKA corporation, solid content concentration: 50 mass %) . . . 10 mass %
- Solvent: 2-pyrrolidone . . . 16.0 mass %
- Solvent: 2-methyl-1,3-propanediol . . . 9.0 mass %
- Surfactant: product name: "OLFINE E1010", manufactured by Nissin Chemical Industry Co., Ltd . . . 1.0 mass %
- Water . . . remainder (mass %) of the total mass of the pretreatment liquid defined as 100 mass %

Preparation of Ink Composition

Synthesis of Dispersing Agent (Polyurethane 1)

Into a three-neck flask, 176.2 g of hexamethylene diisocyanate (HDI), 68.1 g of 2,2-dimethylolpropionic acid (DMPA), 491.9 g of polycarbonatediol (product name: "DURANOL (registered trademark) T5651", manufactured by Asahi Kasei Chemicals Corporation), and 1202.62 g of ethyl acetate were charged, and heated at 70° C.

Note that DURANOL (registered trademark) T5651 is the above-described Compound (2-18) PC where $Rc^1$ and $Rc^2$ are each an alkylene group having 5 or 6 carbon atoms, and Mn is 1000.

Subsequently, to the three-neck flask, 2.454 g of an inorganic bismuth catalyst (product name: "NEOSTANN U-600" manufactured by Nitto Kasei Co., Ltd.) was added and stirring was performed at 70° C. for 5 hours. Furthermore, 515.41 g of isopropyl alcohol and 711.75 g of ethyl acetate were added, and stirring was performed at 70° C. for 3 hours. After the stirring, the reaction solution was left to cool to room temperature (23° C.). Ethyl acetate was used to adjust the concentration to thereby provide a 30 mass % solution of polyurethane (solvent: mixed solution of ethyl acetate/isopropyl alcohol).

Note that a portion of the isopropyl alcohol also functions as a terminal capping agent for the polyurethane. The polyurethane was found to have a weight-average molecular weight of 15000 and an acid value of 0.69 mmol/g.

Preparation of Dispersion Liquid of Coloring Resin Particles

Preparation of Oil-Phase Component

Ethyl acetate, the 30 mass % solution of Polyurethane 1, and an oil-soluble dye C.I. Solvent Black 3 (trade name: "Oil Black 860", manufactured by ORIENT CHEMICAL INDUSTRIES CO., LTD "SB-3" in Tables) were mixed together and stirred for 15 minutes, to thereby provide 149.8 g of an oil-phase component having a solid content of 30 mass %.

In the preparation of the oil-phase component, the amounts of the 30 mass % solution of Polyurethane 1 and SB-3 used were adjusted such that, in the oil-phase component, the SB-3 content was 1.5 times the Polyurethane 1 content.

Preparation of Aqueous-Phase Component

Distilled water (135.3 g) and sodium hydroxide serving as a neutralizer were mixed together and stirred for 15 minutes, to thereby prepare an aqueous-phase component.

The usage amount of sodium hydroxide serving as a neutralizer was adjusted such that, in the coloring resin particles to be produced, the degree of neutralization became 90%.

The specific amount of sodium hydroxide was determined by the following calculation formula.

Amount of sodium hydroxide (g)=Total amount of oil-phase component (g)×(Solid content concentration of oil-phase component (mass %)/100)×(Polyurethane 1 content relative to solid content amount of oil-phase component (mass %)/100)×Acid value of Polyurethane 1 (mmol/g)×0.9×Molecular weight of sodium hydroxide (g/mol)/1000

Preparation of Dispersion Liquid

The oil-phase component and the aqueous-phase component were mixed together, and the resultant mixture was emulsified at room temperature using a homogenizer at 18000 rpm for 10 minutes, to provide an emulsion. The obtained emulsion was added to 48.0 g of distilled water; the resultant liquid was heated to 50° C. and stirred at 50° C. for 5 hours, to thereby drive off, from the liquid, ethyl acetate and isopropyl alcohol.

The liquid from which ethyl acetate and isopropyl alcohol had been driven off was diluted with distilled water such that the solid content concentration became 20 mass %, to thereby provide a dispersion liquid of coloring resin particles.

Preparation of Ink Composition

The dispersion liquid (35.0 g) of coloring resin particles (solid content concentration: 20 mass %), 30.0 g of tetraethylene glycol, and 1.0 g of a surfactant (product name: "OLFINE E1010", manufactured by Nissin Chemical Industry Co., Ltd.) were mixed together, and ion-exchanged water was added such that the total amount became 100 g. The mixture was filtered through a 5.0 μm filter, to thereby provide an ink composition.

Example 2 to Example 27 and Comparative Example 1 to Comparative Example 5

Pretreatment liquids and ink compositions were prepared as in Example 1 except that the cationic compound, the solvent, and the surfactant used for preparing the pretreatment liquid in Example 1 were changed to the types and the contents described in Table 3-1 to Table 6, and the water-insoluble dye, the dispersing agent, the solvent, and the surfactant used for preparing the ink composition in Example 1 were changed to the types and the contents described in Table 3-1 to Table 6. In Tables, for the cationic compounds, the type, molecular weight per cationic valence, weight-average molecular weight, and pH in a 1 mass % aqueous solution are described. For solvents, the boiling points are described in parentheses. In Tables, for components not contained, "-" are described.

Hereinafter, the cationic compounds and the surfactants used for preparation of the pretreatment liquids of Examples and Comparative Examples and described in Table 3-1 to Table 6 will be described.

Cationic Compounds
PAPYOGEN P-300 . . . dicyandiamide-diethylenetriamine condensation product, manufactured by SENKA corporation, solid content concentration: 55 mass %

PAS-H-5L . . . aqueous solution of diallyldimethylammonium chloride polymer, manufactured by NITTOBO MEDICAL CO., LTD., solid content concentration: 28 mass %

PAS-H-10L . . . aqueous solution of diallyldimethylammonium chloride condensation product, manufactured by NITTOBO MEDICAL CO., LTD., solid content concentration: 28 mass %

PAS-J-81 . . . aqueous solution of diallyldimethylammonium chloride-acrylamide copolymer, manufactured by NITTOBO MEDICAL CO., LTD., solid content concentration: 25 mass %

PAS-J-41 . . . aqueous solution of diallyldimethylammonium chloride-acrylamide copolymer, manufactured by NITTOBO MEDICAL CO., LTD., solid content concentration: 25 mass %

UNISENCE KHF10P . . . dicyandiamide-formaldehyde condensation product, manufactured by SENKA corporation, solid content concentration: 100 mass %

PAS-M-1A . . . aqueous solution of methyldiallylamine acetic acid salt polymer, manufactured by NITTOBO MEDICAL CO., LTD., solid content concentration: 20 mass %, PAS-21CL . . . aqueous solution of diallylaminehydrochloric acid salt polymer, manufactured by NITTOBO MEDICAL CO., LTD., solid content concentration: 25 mass %

PAS-M-1 . . . aqueous solution of methyldiallylaminehydrochloric acid salt polymer, manufactured by NITTOBO MEDICAL CO., LTD., solid content concentration: 50 mass %

PAS-92A . . . aqueous solution of diallylamine acetic acid salt-sulfur dioxide copolymer, manufactured by NITTOBO MEDICAL CO., LTD., solid content concentration: 20 mass %

PAS-A-1 . . . diallyldimethylammonium chloride-sulfur dioxide copolymer, manufactured by NITTOBO MEDICAL CO., LTD., solid content concentration: 24 mass %

Surfactants
OLFINE E1010: acetylene glycol-based surfactant, manufactured by Nissin Chemical Industry Co., Ltd.

Surfynol 440: acetylene glycol-based surfactant, manufactured by Nissin Chemical Industry Co., Ltd.

Capstone FS-3100: fluorosurfactant, manufactured by E. I. du Pont de Nemours and Company Hereinafter, the water-insoluble dyes and the dispersing agents used for preparing the ink compositions in Examples and Comparative Examples and described in Table 3-1 to Table 6 will be described.

Water-Insoluble Dyes
SB-3: C.I. Solvent Black 3 (product name: "Oil Black 860", manufactured by ORIENT CHEMICAL INDUSTRIES CO., LTD.

SB-27: C.I. Solvent Black 27 (product name: "Orasol (registered trademark) Black X51", manufactured by BASF)

SB-28: C.I. Solvent Black 28 (product name: "Orasol (registered trademark) Black X45", manufactured by BASF)

SB-29: C.I. Solvent Black 29 (product name: "Orasol (registered trademark) Black X55", manufactured by BASF)

For "d-1" to "d-10", synthesis was performed by subjecting C.I. Reactive Black 5 or C.I. Acid Black 1 below to an oil-soluble treatment. Specific structures of "d-1" to "d-10" will be described in Table 1 and Table 2. The synthesis methods for "d-1" to "d-10" will be described below.

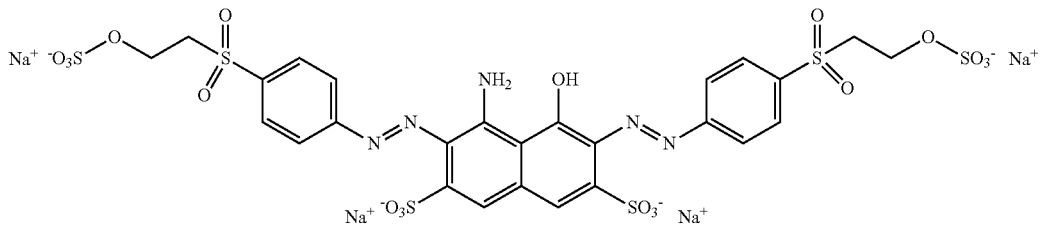

C.I. Reactive Black 5

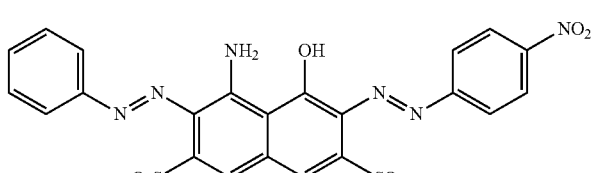

C.I. Acid Black 1

Synthesis of d-6

In a 300 mL three-neck recovery flask, 20 g of C.I. Reactive Black 5 (manufactured by Aldrich) and 11.84 g of water were stirred at 30° C. for 1 hour. After the stirring, 5.1 g of t-octylamine (manufactured by FUJIFILM Wako Pure Chemical Corporation), 31.17 g of ethyl acetate, 10.39 g of methyl ethyl ketone, and 5.71 g of sodium carbonate were added and stirring was performed at 60° C. for 2 hours. Furthermore, 53.4 g of water was added, cooling to 30° C. was performed, and subsequently stirring was performed for 2 hours. The resultant precipitate was collected by filtration and dried to thereby obtain d-6. The structure was identified by $^1$H-NMR (DMSO). For d-6, the NMR data is as follows.

NMR Data of d-6

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 1.29 (s, 4H), 1.12 (s, 12H), 0.93 (s, 18H)

Synthesis of d-2 to d-5 and d-7 to d-9

The same method as in the synthesis of d-6 was performed to obtain d-2 to d-5 and d-7 to d-9 respectively except that t-octylamine was changed to the same number of moles of 2-ethylhexanol, the same number of moles of 1-dodecylthiol, the same number of moles of 3-(2-ethylhexyloxy) propylamine, the same number of moles of isobutylamine, the same number of moles of dibutylamine, the same number of moles of dihexylamine, or the same number of moles of dioctylamine.

These structures were identified also by $^1$H-NMR (DMSO).

NMR Data of d-2

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 1.57-1.50 (m, 6H), 1.31-1.12 (m, 16H), 0.89-0.75 (m, 12H)

NMR Data of d-3

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.15-3.44 (m, 8H), 2.81-2.72 (q, 4H), 2.41 (t, 4H), 1.58-1.41 (m, 8H), 1.29-1.25 (m, 32H), 0.90-0.76 (m, 6H)

NMR Data of d-4

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 6H), 2.81-2.72 (q, 4H), 2.50-2.41 (m, 4H), 1.57-1.50 (m, 10H), 1.31-1.12 (m, 16H), 0.89-0.75 (m, 12H)

NMR Data of d-5

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.50-2.41 (m, 4H), 1.67 (s, 2H), 0.89-0.75 (m, 12H)

NMR Data of d-7

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.25 (q, 8H), 1.29-1.12 (m, 16H), 0.89-0.81 (m, 12H)

NMR Data of d-8

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.25 (q, 8H), 1.29-1.12 (m, 32H), 0.89-0.81 (m, 12H)

NMR Data of d-9

$^1$H-NMR (400 MHz, DMSO-d6): 15.61-15.15 (s, 1H), 10.65-10.48 (d, 2H), 8.29 (d, 2H), 8.18-7.90 (m, 6H), 7.49 (s, 1H), 7.41 (s, 1H), 3.48-3.44 (q, 4H), 2.81-2.72 (q, 4H), 2.25 (q, 8H), 1.29-1.12 (m, 48H), 0.89-0.81 (m, 12H)

Synthesis of d-10

The same procedures as in the synthesis of d-9 were performed to obtain d-10 except that, as the raw material, C.I. Reactive Black 5 in the form of Na salt was replaced by Reactive Black 5 in the form of K salt, and sodium carbonate was changed to the same number of moles of potassium carbonate. The structure was identified by 1H-NMR (DMSO). The NMR data is the same as that of d-9 and hence omitted.

Synthesis of d-1

To a 500 mL recovery flask, 141.9 g of a 10 mass % aqueous solution of benzyldimethyloctylammonium chloride was added, subsequently 154.1 g of a 10 mass % aqueous solution of C.I. Acid Black 1 was added dropwise over 30 minutes, and stirring was performed for 2 hours. The resultant precipitate was collected using filter cloth and dried, to obtain d-1. The structure was identified by 1H-NMR (DMSO). The NMR data of d-1 is as follows.

NMR Data of d-1

1H-NMR (400 MHz, DMSO-d6): 10.80 (s, 1H), 10.58 (s, 1H), 8.39 (d, 2H), 8.23 (d, 2H), 7.81 (q, 2H), 7.61-7.42 (m, 13H), 7.40 (s, 1H), 7.28 (t, 1H), 4.51 (s, 4H), 3.19-3.29 (m, 4H), 2.91 (s, 12H), 1.31-1.20 (m, 24H), 0.89-0.80 (t, 6H)

TABLE 1

| Dye structure (before made to be oil-soluble) | Dye structure (after made to be oil-soluble) | Cation structure |
|---|---|---|
| d-1 Acid Black 1 | [chemical structure: naphthalene with NH$_2$, OH, two azo linkages to phenyl and p-NO$_2$-phenyl, and two SO$_3^-$ groups] | [chemical structure: benzyl-N$^+$(CH$_3$)$_2$-C$_8$H$_{17}$] 2 |

TABLE 1-continued

| Dye structure (before made to be oil-soluble) | | Dye structure (after made to be oil-soluble) | Cation structure |
|---|---|---|---|
| d-2 | Reactive Black 5 | | 2Na⁺ |
| d-3 | Reactive Black 5 | | 2Na⁺ |
| d-4 | Reactive Black 5 | | 2Na⁺ |
| d-5 | Reactive Black 5 | | 2Na⁺ |
| d-6 | Reactive Black 5 | | 2Na⁺ |
| d-7 | Reactive Black 5 | | 2Na⁺ |
| d-8 | Reactive Black 5 | | 2Na⁺ |

TABLE 2

| Dye structure (before made to be oil-soluble) | | Dye structure (after made to be oil-soluble) | Cation structure |
|---|---|---|---|
| d-9 | Reactive Black 5 | [chemical structure] | 2Na⁺ |
| d-10 | Reactive Black 5 | [chemical structure] | 2K⁺ |

Dispersing Agent

Polyurethane 1 . . . polyurethane synthesized by the method described in Example 1

Styrene-acrylic . . . styrene-acrylic acid copolymer (product name: "JONCRYL 678", manufactured by BASF)

The following are methods for synthesizing Polyurethane 2, Polyurethane 3, and Polyurethane-urea.

SYNTHESIS of dispersing agent (Polyurethane 2)

Into a three-neck flask, 160.0 g of 4,4'methylenebis(cyclohexyl isocyanate) (HMDI), 70.0 g of 2,2-dimethylolpropionic acid (DMPA), 85.0 g of polycarbonatediol (product name: "DURANOL (registered trademark) T5651", manufactured by Asahi Kasei Chemicals Corporation), and 315.0 g of ethyl acetate were charged, and heated at 70° C.

Subsequently, to the three-neck flask, 0.2 g of an inorganic bismuth catalyst (product name: "NEOSTANN U-600" manufactured by Nitto Kasei Co., Ltd.) was added and stirring was performed at 70° C. for 5 hours. Furthermore, 220.2 g of isopropyl alcohol and 199.0 g of ethyl acetate were added, and stirring was performed at 70° C. for 3 hours. After the stirring, the reaction solution was left to cool to room temperature (23° C.). Ethyl acetate was used to adjust the concentration to thereby provide a 30 mass % solution of Polyurethane 2 (solvent: mixed solution of ethyl acetate/isopropyl alcohol).

Note that a portion of the isopropyl alcohol also functions as a terminal capping agent for Polyurethane 2. Polyurethane 2 was found to have a weight-average molecular weight of 10000 and an acid value of 95 mgKOH/g.

Synthesis of Dispersing Agent (Polyurethane 3)

Into a three-neck flask, 58.0 g of trimethylhexamethylene diisocyanate (TMHDI), 13.4 g of 2,2-dimethylolpropionic acid (DMPA), 130.0 g of polycarbonatediol (product name: "DURANOL (registered trademark) T5651", manufactured by Asahi Kasei Chemicals Corporation), 8.0 g of tricyclo [5.2.1.0(2,6)]decanedimethanol, and 209.4 g of ethyl acetate were charged, and heated at 70° C.

Subsequently, to the three-neck flask, 0.2 g of an inorganic bismuth catalyst (product name: "NEOSTANN U-600" manufactured by Nitto Kasei Co., Ltd.) was added and stirring was performed at 70° C. for 5 hours. Furthermore, 146.4 g of isopropyl alcohol and 132.3 g of ethyl acetate were added, and stirring was performed at 70° C. for 3 hours. After the stirring, the reaction solution was left to cool to room temperature (23° C.). Ethyl acetate was used to adjust the concentration to thereby provide a 30 mass % solution of Polyurethane 3 (solvent: mixed solution of ethyl acetate/isopropyl alcohol).

Note that a portion of the isopropyl alcohol also functions as a terminal capping agent for Polyurethane 3. Polyurethane 3 was found to have a weight-average molecular weight of 15000 and an acid value of 11 mgKOH/g.

Synthesis of Dispersing Agent (Polyurethane-Urea)

Into a three-neck flask, 69.4 g of trimethylhexamethylene diisocyanate (TMHDI), 13.4 g of 2,2-dimethylolpropionic acid (DMPA), 38.3 g of isophoronediamine, and 136.9 g of ethyl acetate were charged, and heated at 70° C.

Subsequently, to the three-neck flask, 0.2 g of an inorganic bismuth catalyst (product name: "NEOSTANN U-600" manufactured by Nitto Kasei Co., Ltd.) was added and stirring was performed at 70° C. for 5 hours. Furthermore, 95.7 g of isopropyl alcohol and 86.5 g of ethyl acetate were added, and stirring was performed at 70° C. for 3 hours. After the stirring, the reaction solution was left to cool to room temperature (23° C.). Ethyl acetate was used to adjust the concentration to thereby provide a 30 mass % solution of Polyurethane-urea (solvent: mixed solution of ethyl acetate/isopropyl alcohol).

Note that a portion of the isopropyl alcohol also functions as a terminal capping agent for Polyurethane-urea. Polyurethane-urea was found to have a weight-average molecular weight of 10000 and an acid value of 45 mgKOH/g.

Ink Jet Textile Printing

The pretreatment liquids prepared in Examples and Comparative Examples were used to pretreat textiles. The ink compositions prepared in Examples and Comparative Examples were applied to the pretreated textiles, and heat-treated to thereby obtain printed textiles. This will be described in detail as follows. Note that a textile printing method in which the pretreatment liquid is used by a padding process to perform immersion of a textile and the ink composition is applied by an ink jet recording process to the pretreated textile is defined as "Textile printing method 1", and a textile printing method in which the pretreatment liquid and the ink composition are each applied by an ink jet recording process is defined as "Textile printing method 2".

Textile Printing Method 1
Pretreatment of Textiles

As the textiles, strips (15 cm×4 cm) of 100% cotton cloth (product name: "Cotton D5005", manufactured by Akahori Sangyo) were prepared.

The pretreatment liquids prepared in Examples and Comparative Examples were caused, by a padding process, to permeate the textiles, and the textiles were then squeezed at a pick up of 70% and dried for 24 hours. Note that the term "pick up (%)" refers to, in such a squeezed textile including the pretreatment liquid, the residual amount (mass ratio) of the pretreatment liquid to the textile.

Application of Ink Composition

As the ink jet recording apparatus, an apparatus equipped with an ink jet head (product name: "StarFire SG-1024SA", manufactured by Fujifilm Dimatix Inc.) and an ink circulation pump was prepared. As the recording medium, such a pretreated textile was fixed on the stage. The ink tank connected to the ink jet head was charged with the ink composition. The ink jet head was placed in a line such that the nozzles were arranged in a direction orthogonal to the movement direction of the stage. The ink composition was ejected under conditions of a drop volume of 60 pL, an ejection frequency of 10 kHz, and a resolution of 400 dpi×400 dpi. The ink circulation pump was operated such that the ink composition was circulated between the ink tank and the ink jet head. Over the recording medium, the ink composition was ejected, to record an image, to obtain a colored textile.

Heat Treatment (Heat-Press)

The obtained colored textile was heat-treated using a heat-press machine (desktop automatic flat press machine, model: AF-54TEN, manufactured by Asahi Garment Machinery Co., LTD.) under conditions of 160° C. and 120 seconds, to obtain a printed textile.

Textile Printing Method 2

As the textiles, strips (15 cm×4 cm) of 100% cotton cloth (product name: "Cotton D5005", manufactured by Akahori Sangyo) were prepared.

As the ink jet recording apparatus, an apparatus equipped with an ink jet head (product name: "StarFire SG-1024SA", manufactured by Fujifilm Dimatix Inc.) and an ink circulation pump was prepared. As the recording medium, such a textile was fixed on the stage. The ink tanks connected to the ink jet head were individually charged with the pretreatment liquid and the ink composition. The ink jet head was placed in a line such that the nozzles were arranged in a direction orthogonal to the movement direction of the stage. The pretreatment liquid and the ink composition were ejected under conditions of a drop volume of 60 pL, an ejection frequency of 10 kHz, and a resolution of 400 dpi×400 dpi. The ink circulation pump was operated such that the pretreatment liquid and the ink composition were circulated between the ink tanks and the ink jet head.

First, over the whole surface of the recording medium, the pretreatment liquid was ejected, to record a solid image. Hot air at 60° C. was used for drying for 10 seconds; subsequently, the ink composition was ejected to record an image, to obtain a colored textile.

The obtained colored textile was heat-treated using a heat-press machine (desktop automatic flat press machine, model: AF-54TEN, manufactured by Asahi Garment Machinery Co., LTD.) under conditions of 160° C. and 120 seconds, to obtain a printed textile.

Evaluations

Such printed textiles were subjected to evaluations below. The evaluations were performed in the following manner. Table 3-1 to Table 6 describe the evaluation results.

Color Fastness to Washing and Laundering (Color Staining)

In the above-described Textile printing method 1, the ink composition was used to record a solid image over the whole surface of the recording medium, to obtain a printed textile.

The printed textile was evaluated in terms of color staining in accordance with B1S in ISO 105-006: 2010. Of the evaluation results, 5 is the highest rank corresponding to no occurrence of color staining in the printed textile. The rank 3-4, rank 4, rank 4-5, and rank 5 correspond to levels at which no problems are caused in practical use.

In the evaluation results,
"1-2" means being higher than the rank 1 and lower than the rank 2.
"2-3" means being higher than the rank 2 and lower than the rank 3.
"3-4" means being higher than the rank 3 and lower than the rank 4.
"4-5" means being higher than the rank 4 and lower than the rank 5.

Bleeding

In the above-described Textile printing method 1, the ink composition was used to record MS Mincho letters (unicode: U+9DF9) as reverse type at 8 pt (points), 10 pt, 12 pt, and 14 pt, to obtain a printed textile. Whether or not the letters were clearly readable from a position 0.5 m away from the printed textile was determined. Specifically, whether or not, in FIG. 1, a horizontal line denoted by reference sign 111 and a horizontal line denoted by reference sign 112 were recognized as being recorded so as to be separated from each other was determined. The evaluation ranks will be described below. The rank 4 and the rank 5 correspond to levels at which no problems are caused in practical use.

Note that the term "reverse type" refers to letters recorded such that, in a region filled with a specified color, portions are left uncolored in white.

5: the 8 pt letter has no bleeding and is clearly readable.
4: the 8 pt letter has bleeding, but the 10 pt letter has no bleeding and is clearly readable.
3: the 8 pt and 10 pt letters have bleeding, but the 12 pt letter has no bleeding and is clearly readable.
2: the 8 pt, 10 pt, and 12 pt letters have bleeding, but the 14 pt letter has no bleeding and is clearly readable.
1: each letter has bleeding and is unreadable.

Ejection Performance of Pretreatment Liquid

In the above-described Textile printing method 2, the pretreatment liquid was ejected at an application amount of 30 g/m² in a single pass over the whole surface of the recording medium, and subsequently the ink composition was used in an application amount of 15 g/m² in a 3 pass scanning mode to record a solid image, to provide a printed textile. In the printed textile, whether or not streaks were observed was visually determined. The evaluation ranks will be described below. The rank 4 and the rank 5 correspond to levels at which no problems are caused in practical use.

5: no streaks are observed.
4: a single light streak is observed.
3: two to four light streaks are observed.
2: a single dark streak is observed.
1: two or more dark streaks are observed

Corrosiveness to Member

In an ink jet head (product name: "StarFire SG-1024SA", manufactured by Fujifilm Dimatix Inc.), a member Flink (Part number 2100032767) was placed in a polypropylene container and immersed in the pretreatment liquid. At 32° C., after the lapse of one week, one month, or three months, the degree of corrosion of the member (metal wiring region) was visually observed. The rank 4 and the rank 5 correspond to levels at which no problems are caused in practical use.

5: after the lapse of three months, corrosion of the metal wiring region was not observed.

4: after the lapse of one month, corrosion of the metal wiring region was not observed; however, corrosion was observed after the lapse of three months.

3: after the lapse of one week, corrosion of the metal wiring region was not observed; however, corrosion was observed after the lapse of one month.

2: after the lapse of one week, slight corrosion of the metal wiring region was observed.

1: after the lapse of one week, noticeable corrosion of the metal wiring region was observed.

TABLE 3-1

| | | | | Example 1 | Example 2 | Example 3 | Example 4 | Example 5 |
|---|---|---|---|---|---|---|---|---|
| Pretreatment liquid | Cationic compound | | Type | PAS-H-5L | PAS-J-81 | PAS-H-5L | PAS-H-5L | PAS-H-5L |
| | | | Content (mass %) | 10.0 | 10.0 | 10.0 | 10.0 | 10.0 |
| | | | Molecular weight per cationic valence | 161.7 | 151.6 | 161.7 | 161.7 | 161.7 |
| | | | Weight-average molecular weight | 30000 | 180000 | 30000 | 30000 | 30000 |
| | | | pH | 4.0 | 6.5 | 4.0 | 4.0 | 4.0 |
| | Solvent | 2-Pyrrolidone (245° C.) | Content (mass %) | 16.0 | 16.0 | 16.0 | 16.0 | 16.0 |
| | | 2-Methyl-1,3-propanediol (214° C.) | Content (mass %) | 9.0 | 9.0 | 9.0 | 9.0 | 9.0 |
| | | Glycerol (290° C.) | Content (mass %) | — | — | — | — | — |
| | | Solvent having boiling point of 240° C. or more | Content (mass %) | 16.0 | 16.0 | 16.0 | 16.0 | 16.0 |
| | Surfactant | OLFINE E1010 | Content (mass %) | 1.0 | 1.0 | 1.0 | 1.0 | 1.0 |
| Ink composition | Water-insoluble dye | | Type | SB-28 | SB-28 | SB-28 | SB-28 | SB-28 |
| | | | Content (mass %) | 6 | 6 | 6 | 6 | 6 |
| | Dispersing agent | | Type | Polyurethane 1 | Polyurethane 1 | Styrene-acrylic | Polyurethane 2 | Polyurethane 3 |
| | | | Content (mass %) | 4 | 4 | 4 | 4 | 4 |
| | | | Weight-average molecular weight | 15000 | 15000 | 8500 | 10000 | 15000 |
| | | | Acid value (mgKOH/g) | 39 | 39 | 215 | 95 | 11 |
| | Solvent | Tetraethylene glycol | Content (mass %) | 30 | 30 | 30 | 30 | 30 |
| | Cationic compound/dispersing agent (Mw ratio) | | | 2 | 12 | 3.5 | 3 | 2 |
| Evaluations | Color fastness to washing and laundering (color staining) | | | 4-5 | 3-4 | 3-4 | 3-4 | 3-4 |
| | Bleeding | | | 5 | 5 | 4 | 4 | 5 |
| | Corrosiveness to member | | | 4 | 5 | 4 | 4 | 4 |
| | Ejection performance of pretreatment liquid | | | — | — | — | — | 5 |

TABLE 3-2

| | | | | Example 6 | Example 7 | Example 8 | Example 9 | Example 10 |
|---|---|---|---|---|---|---|---|---|
| Pretreatment liquid | Cationic compound | | Type | PAS-H-5L | PAS-H-10L | PAS-J-81 | UNISENCE KHF10P | PAS-M-1A |
| | | | Content (mass %) | 10.0 | 3.0 | 10.0 | 10.0 | 10.0 |
| | | | Molecular weight per cationic valence | 161.7 | 161.7 | 151.6 | 191.6 | 171.2 |
| | | | Weight-average molecular weight | 30000 | 30000 | 180000 | — | 20000 |
| | | | pH | 4.0 | 4.0 | 6.5 | 6.5 | 6.5 |
| | Solvent | 2-Pyrrolidone (245° C.) | Content (mass %) | 10.0 | 53.0 | 10.0 | 16.0 | 16.0 |
| | | 2-Methyl-1,3-propanediol (214° C.) | Content (mass %) | 9.0 | — | — | 9.0 | 9.0 |
| | | Glycerol (290° C.) | Content (mass %) | — | — | 10.0 | — | — |
| | | Solvent having boiling point of 240° C. or more | Content (mass %) | 10.0 | 53.0 | 20.0 | 16.0 | 16.0 |
| | Surfactant | OLFINE E1010 | Content (mass %) | 1.0 | 1.0 | 1.0 | 1.0 | 1.0 |
| Ink composition | Water-insoluble dye | | Type | SB-28 | SB-28 | SB-28 | SB-28 | SB-28 |
| | | | Content (mass %) | 6 | 6 | 6 | 6 | 6 |
| | Dispersing agent | | Type | Polyurethane 3 | Polyurethane 3 | Polyurethane 1 | Polyurethane 1 | Polyurethane 1 |
| | | | Content (mass %) | 4 | 4 | 4 | 4 | 4 |
| | | | Weight-average molecular weight | 15000 | 15000 | 15000 | 15000 | 15000 |
| | | | Acid value (mgKOH/g) | 11 | 11 | 39 | 39 | 39 |
| | Solvent | Tetraethylene glycol | Content (mass %) | 30 | 30 | 30 | 30 | 30 |
| | Cationic compound/dispersing agent (Mw ratio) | | | 2 | 2 | 12 | — | 1.33 |

TABLE 3-2-continued

|  |  | Example 6 | Example 7 | Example 8 | Example 9 | Example 10 |
|---|---|---|---|---|---|---|
| Evaluations | Color fastness to washing and laundering (color staining) | 3-4 | 3-4 | 3-4 | 3-4 | 3-4 |
|  | Bleeding | 5 | 4 | 5 | 3-4 | 4 |
|  | Corrosiveness to member | 4 | 5 | 5 | 4 | 4 |
|  | Ejection performance of pretreatment liquid | 4 | 3 | 5 | 4 | 4 |

TABLE 4-1

|  |  |  |  | Example 11 | Example 12 | Example 13 | Example 14 |
|---|---|---|---|---|---|---|---|
| Pretreatment liquid | Cationic compound |  | Type | PAS-H-5L | PAPYOGEN P-300 | PAPYOGEN P-300 | PAPYOGEN P-300 |
|  |  |  | Content (mass %) | 10.0 | 10.0 | 10.0 | 10.0 |
|  |  |  | Molecular weight per cationic valence | 161.7 | 204.7 | 204.7 | 204.7 |
|  |  |  | Weight-average molecular weight | 30000 | — | — | — |
|  |  |  | pH | 4.0 | 6.5 | 6.5 | 6.5 |
|  | Solvent | 2-Pyrrolidone (245° C.) | Content (mass %) | 16.0 | 16.0 | 16.0 | 16.0 |
|  |  | 2-Methyl-1,3-propanediol (214° C.) | Content (mass %) | 9.0 | 9.0 | 9.0 | 9.0 |
|  |  | Solvent having boiling point of 240° C. or more | Content (mass %) | 16.0 | 16.0 | 16.0 | 16.0 |
|  | Surfactant | OLFINE E1010 | Content (mass %) | 1.0 | 1.0 | — | — |
|  |  | Surfynol 440 | Content (mass %) | — | — | 0.4 | — |
|  |  | Capstone FS-3100 | Content (mass %) | — | — | — | 0.1 |
| Ink composition | Water-insoluble dye |  | Type | SB-3 | SB-3 | SB-3 | SB-3 |
|  |  |  | Content (mass %) | 4.2 | 4.2 | 4.2 | 4.2 |
|  | Dispersing agent |  | Type | Polyurethane-urea | Polyurethane 1 | Polyurethane 1 | Polyurethane 1 |
|  |  |  | Content (mass %) | 2.8 | 2.8 | 2.8 | 2.8 |
|  |  |  | Weight-average molecular weight | 10000 | 15000 | 15000 | 15000 |
|  |  |  | Acid value (mgKOH/g) | 45 | 39 | 39 | 39 |
|  | Solvent | Tetraethylene glycol | Content (mass %) | 30 | 30 | 30 | 30 |
|  | Cationic compound/dispersing agent (Mw ratio) |  |  | 3 | — | — | — |
| Evaluations | Color fastness to washing and laundering (color staining) |  |  | 3-4 | 4-5 | 4-5 | 4-5 |
|  | Bleeding |  |  | 4 | 4 | 5 | 5 |
|  | Corrosiveness to member |  |  | 4 | 5 | 5 | 5 |
|  | Ejection performance of pretreatment liquid |  |  | 4 | 5 | 5 | 5 |

TABLE 4-2

|  |  |  |  | Example 15 | Example 16 | Example 17 |
|---|---|---|---|---|---|---|
| Pretreatment liquid | Cationic compound |  | Type | PAS-H-5L | PAS-H-5L | Trimethylphenylammonium chloride |
|  |  |  | Content (mass %) | 10.0 | 10.0 | 10.0 |
|  |  |  | Molecular weight per cationic valence | 161.7 | 161.7 | 171.7 |
|  |  |  | Weight-average molecular weight | 30000 | 30000 | 171.7 |
|  |  |  | pH | 4.0 | 4.0 | 5.5 |
|  | Solvent | 2-Pyrrolidone (245° C.) | Content (mass %) | 16.0 | 16.0 | 16.0 |
|  |  | 2-Methyl-1,3-propanediol (214° C.) | Content (mass %) | 9.0 | 9.0 | 9.0 |
|  |  | Solvent having boiling point of 240° C. or more | Content (mass %) | 16.0 | 16.0 | 16.0 |
|  | Surfactant | OLFINE E1010 | Content (mass %) | 1.0 | 1.0 | 1.0 |
|  |  | Surfynol 440 | Content (mass %) | — | — | — |
|  |  | Capstone FS-3100 | Content (mass %) | — | — | — |
| Ink composition | Water-insoluble dye |  | Type | SB-27 | SB-29 | SB-3 |
|  |  |  | Content (mass %) | 6 | 6 | 4.2 |
|  | Dispersing agent |  | Type | Polyurethane 1 | Polyurethane 1 | Polyurethane 1 |
|  |  |  | Content (mass %) | 4 | 4 | 2.8 |
|  |  |  | Weight-average molecular weight | 15000 | 15000 | 15000 |
|  |  |  | Acid value (mgKOH/g) | 39 | 39 | 39 |
|  | Solvent | Tetraethylene glycol | Content (mass %) | 30 | 30 | 30 |
|  | Cationic compound/dispersing agent (Mw ratio) |  |  | 2 | 2 | 0.01 |
| Evaluations | Color fastness to washing and laundering (color staining) |  |  | 3-4 | 3-4 | 3-4 |
|  | Bleeding |  |  | 5 | 5 | 3-4 |

TABLE 4-2-continued

|  | Example 15 | Example 16 | Example 17 |
|---|---|---|---|
| Corrosiveness to member | 4 | 4 | 4 |
| Ejection performance of pretreatment liquid | 4 | 4 | 3-4 |

TABLE 5-1

|  |  |  |  | Example 18 | Example 19 | Example 20 | Example 21 | Example 22 |
|---|---|---|---|---|---|---|---|---|
| Pretreatment liquid | Cationic compound |  | Type | PAPYOGEN P-300 | PAPYOGEN P-300 | PAPYOGEN P-300 | PAPYOGEN P-300 | PAPYOGEN P-300 |
|  |  |  | Content (mass %) | 10.0 | 10.0 | 10.0 | 10.0 | 10.0 |
|  |  |  | Molecular weight per cationic valence | 204.7 | 204.7 | 204.7 | 204.7 | 204.7 |
|  |  |  | Weight-average molecular weight | — | — | — | — | — |
|  |  |  | pH | 6.5 | 6.5 | 6.5 | 6.5 | 6.5 |
|  | Solvent | 2-Pyrrolidone (245° C.) | Content (mass %) | 16.0 | 16.0 | 16.0 | 16.0 | 16.0 |
|  |  | 2-Methyl-1,3-propanediol (214° C.) | Content (mass %) | 9.0 | 9.0 | 9.0 | 9.0 | 9.0 |
|  |  | Solvent having boiling point of 240° C. or more | Content (mass %) | 16.0 | 16.0 | 16.0 | 16.0 | 16.0 |
|  | Surfactant | OLFINE E1010 | Content (mass %) | 1.0 | 1.0 | 1.0 | 1.0 | 1.0 |
| Ink composition | Water-insoluble dye |  | Type | d-1 | d-2 | d-3 | d-4 | d-5 |
|  |  |  | Content (mass %) | 4.2 | 4.2 | 4.2 | 4.2 | 4.2 |
|  | Dispersing agent |  | Type | Polyurethane 1 | Polyurethane 1 | Polyurethane 1 | Polyurethane 1 | Polyurethane 1 |
|  |  |  | Content (mass %) | 2.8 | 2.8 | 2.8 | 2.8 | 2.8 |
|  |  |  | Weight-average molecular weight | 15000 | 15000 | 15000 | 15000 | 15000 |
|  |  |  | Acid value (mgKOH/g) | 39 | 39 | 39 | 39 | 39 |
|  | Solvent | Tetraethylene glycol | Content (mass %) | 30 | 30 | 30 | 30 | 30 |
|  | Cationic compound/dispersing agent (Mw ratio) |  |  | — | — | — | — | — |
| Evaluations | Color fastness to washing and laundering (color staining) |  |  | 4 | 4 | 4 | 4-5 | 4-5 |
|  | Bleeding |  |  | 5 | 5 | 5 | 5 | 5 |
|  | Corrosiveness to member |  |  | 5 | 5 | 5 | 5 | 5 |
|  | Ejection performance of pretreatment liquid |  |  | 5 | 5 | 5 | 5 | 5 |

TABLE 5-2

|  |  |  |  | Example 23 | Example 24 | Example 25 | Example 26 | Example 27 |
|---|---|---|---|---|---|---|---|---|
| Pretreatment liquid | Cationic compound |  | Type | PAPYOGEN P-300 | PAS-H-5L | PAS-H-5L | PAS-H-5L | PAS-H-5L |
|  |  |  | Content (mass %) | 10.0 | 10.0 | 10.0 | 10.0 | 10.0 |
|  |  |  | Molecular weight per cationic valence | 204.7 | 161.7 | 161.7 | 161.7 | 161.7 |
|  |  |  | Weight-average molecular weight | — | 30000 | 30000 | 30000 | 30000 |
|  |  |  | pH | 6.5 | 4.0 | 4.0 | 4.0 | 4.0 |
|  | Solvent | 2-Pyrrolidone (245° C.) | Content (mass %) | 16.0 | 16.0 | 16.0 | 16.0 | 16.0 |
|  |  | 2-Methyl-1,3-propanediol (214° C.) | Content (mass %) | 9.0 | 9.0 | 9.0 | 9.0 | 9.0 |
|  |  | Solvent having boiling point of 240° C. or more | Content (mass %) | 16.0 | 16.0 | 16.0 | 16.0 | 16.0 |
|  | Surfactant | OLFINE E1010 | Content (mass %) | 1.0 | 1.0 | 1.0 | 1.0 | 1.0 |
| Ink composition | Water-insoluble dye |  | Type | d-6 | d-7 | d-8 | d-9 | d-10 |
|  |  |  | Content (mass %) | 4.2 | 4.2 | 4.2 | 4.2 | 4.2 |
|  | Dispersing agent |  | Type | Polyurethane 1 | Polyurethane 1 | Polyurethane 1 | Polyurethane 1 | Polyurethane 1 |
|  |  |  | Content (mass %) | 2.8 | 2.8 | 2.8 | 2.8 | 2.8 |
|  |  |  | Weight-average molecular weight | 15000 | 15000 | 15000 | 15000 | 15000 |
|  |  |  | Acid value (mgKOH/g) | 39 | 39 | 39 | 39 | 39 |
|  | Solvent | Tetraethylene glycol | Content (mass %) | 30 | 30 | 30 | 30 | 30 |
|  | Cationic compound/dispersing agent (Mw ratio) |  |  | — | 2 | 2 | 2 | 2 |
| Evaluations | Color fastness to washing and laundering (color staining) |  |  | 4-5 | 4-5 | 4-5 | 4-5 | 4-5 |
|  | Bleeding |  |  | 5 | 5 | 5 | 5 | 5 |
|  | Corrosiveness to member |  |  | 5 | 4 | 4 | 4 | 4 |
|  | Ejection performance of pretreatment liquid |  |  | 5 | 5 | 5 | 5 | 5 |

TABLE 6

|  |  |  | Comparative Example 1 | Comparative Example 2 | Comparative Example 3 | Comparative Example 4 | Comparative Example 5 |
|---|---|---|---|---|---|---|---|
| Pretreatment liquid | Cationic compound | Type | PAS-J-41 | PAS-21CL | PAS-M-1 | PAS-92A | PAS-A-1 |
|  |  | Content (mass %) | 10.0 | 10.0 | 10.0 | 10.0 | 10.0 |
|  |  | Molecular weight per cationic valence | 143.6 | 118.8 | 147.6 | 221.3 | 225.7 |
|  |  | Weight-average molecular weight | 10000 | 50000 | 20000 | 5000 | 5000 |
|  |  | pH | 4.0 | 2.5 | 2.5 | 1.5 | 2.5 |
|  | Solvent | 2-Pyrrolidone (245° C.) Content (mass %) | 16.0 | 16.0 | 16.0 | 16.0 | 16.0 |
|  |  | 2-Methyl-1,3-propanediol (214° C.) Content (mass %) | 9.0 | 9.0 | 9.0 | 9.0 | 9.0 |
|  |  | Glycerol (290° C.) Content (mass %) | — | — | — | — | — |
|  |  | Solvent having boiling point of 240° C. or more Content (mass %) | 16.0 | 16.0 | 16.0 | 16.0 | 16.0 |
|  | Surfactant | OLFINE E1010 Content (mass %) | 1.0 | 1.0 | 1.0 | 1.0 | 1.0 |
| Ink composition | Water-insoluble dye | Type | SB-28 | SB-28 | SB-3 | SB-28 | SB-28 |
|  |  | Content (mass %) | 6 | 6 | 6 | 6 | 6 |
|  | Dispersing agent | Type | Polyurethane 1 | Polyurethane 1 | Polyurethane 1 | Polyurethane 1 | Polyurethane 1 |
|  |  | Content (mass %) | 4 | 4 | 4 | 4 | 4 |
|  |  | Weight-average molecular weight | 15000 | 15000 | 15000 | 15000 | 15000 |
|  |  | Acid value (mgKOH/g) | 39 | 39 | 39 | 39 | 39 |
|  | Solvent | Tetraethylene glycol Content (mass %) | 30 | 30 | 30 | 30 | 30 |
|  | Cationic compound/dispersing agent (Mw ratio) |  | 0.67 | 3.33 | 1.33 | 0.33 | 0.33 |
| Evaluations | Color fastness to washing and laundering (color staining) |  | 3 | 2 | 3 | 1 | 2 |
|  | Bleeding |  | 5 | 4 | 4 | 3 | 3 |
|  | Corrosiveness to member |  | 4 | 2 | 2 | 1 | 1 |
|  | Ejection performance of pretreatment liquid |  | 5 | 5 | 5 | 5 | 5 |

As described in Table 3-1 to Table 6, it has been demonstrated that Example 1 to Example 27, which have a pretreatment liquid including a cationic compound having a molecular weight per cationic valence of 150 to 220, and an ink composition including a water-insoluble dye, a dispersing agent, and water, wherein the dispersing agent is at least one selected from the group consisting of a urethane resin, a urea resin, and a urethane-urea resin, provide printed textiles that are less likely to cause color staining of other textiles and less likely to cause bleeding.

Example 1, in which the dispersing agent has an acid value of 15 mgKOH/g to 90 mgKOH/g, provided, compared with Example 4 and Example 5, high color fastness to washing and laundering (color staining).

Example 5, in which the pretreatment liquid includes a solvent having a boiling point of 240° C. or more and the content of the solvent relative to the total amount of the pretreatment liquid is 14 mass % to 50 mass %, provided, compared with Example 6 and Example 7, high ejection performance of the pretreatment liquid.

Example 11, in which the cationic compound has a weight-average molecular weight of 10,000 to 200,000, underwent, compared with Example 17, less bleeding. In addition, Example 11, in which the ratio of the weight-average molecular weight of the cationic compound to the weight-average molecular weight of the dispersing agent is 1.5 to 15, underwent, compared with Example 17, less bleeding.

By contrast, it has been demonstrated that, in Comparative Example 1 to Comparative Example 3, in which the cationic compound included in the pretreatment liquid has a molecular weight per cationic valence of less than 150, the color fastness to washing and laundering (color staining) is poor.

In addition, it has been demonstrated that, in Comparative Example 4 and Comparative Example 5, in which the cationic compound included in the pretreatment liquid has a molecular weight per cationic valence of more than 220, the color fastness to washing and laundering (color staining) is poor and the resultant printed textile undergoes bleeding.

As has been described so far, the ink set according to an embodiment of the present disclosure has a pretreatment liquid including a cationic compound having a molecular weight per cationic valence of 150 to 220, and an ink composition including a water-insoluble dye, a dispersing agent, and water, wherein the dispersing agent is at least one selected from the group consisting of a urethane resin, a urea resin, and a urethane-urea resin, to provide a printed textile that is less likely to cause color staining of other textiles and less likely to cause bleeding.

Note that the entire contents disclosed by JP2019-180586 filed in the Japan Patent Office on Sep. 30, 2019 are incorporated herein by reference. All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. A textile printing ink set comprising:
    a pretreatment liquid comprising a cationic compound having a molecular weight per cationic valence of 150 to 220 and a solvent having a boiling point of 240° C. or more, a content of the solvent relative to a total amount of the pretreatment liquid being 14 mass % to 50 mass %; and
    an ink composition comprising a water-insoluble dye, a dispersing agent, and water,
    wherein the dispersing agent is at least one selected from the group consisting of a urethane resin, a urea resin, and a urethane-urea resin, and
    the water-insoluble dye is C.I. Solvent Black 3.

2. The textile printing ink set according to claim 1, wherein the dispersing agent has an acid value of 15 mgKOH/g to 90 mgKOH/g.

3. The textile printing ink set according to claim 1, wherein the cationic compound is at least one selected from the group consisting of a condensation product between dicyandiamide and alkylamine, a condensation product between dicyandiamide and formaldehyde, a polymer comprising, as a monomeric unit, diallyldimethylammonium chloride, and a polymer comprising, as a monomeric unit, methyldiallylamine acetic acid salt.

4. The textile printing ink set according to claim 1, wherein the cationic compound has a weight-average molecular weight of 10,000 to 200,000.

5. The textile printing ink set according to claim 1, wherein a ratio of a weight-average molecular weight of the cationic compound to a weight-average molecular weight of the dispersing agent is 1.5 to 15.

6. The textile printing ink set according to claim 1, wherein the pretreatment liquid further comprises a surfactant.

7. The textile printing ink set according to claim 1, wherein the water-insoluble dye is at least one dye selected from the group consisting of an oil-soluble dye, a disperse dye, and a vat dye.

8. A textile printing method comprising:
applying the pretreatment liquid comprised in the ink set according to claim 1, to a textile; and
applying the ink composition comprised in the ink set according to claim 1, to the textile to which the pretreatment liquid has been applied.

9. The textile printing method according to claim 8, wherein, in the applying of the pretreatment liquid, the pretreatment liquid is applied by an ink jet recording process.

10. The textile printing method according to claim 8, wherein, in the applying of the ink composition, the ink composition is applied by an ink jet recording process.

11. The textile printing method according to claim 8, wherein the textile comprises cellulose fiber.

* * * * *